United States Patent
Chun et al.

(10) Patent No.: US 8,159,978 B2
(45) Date of Patent: Apr. 17, 2012

(54) METHOD AND APPARATUS OF TRANSMITTING FEEDBACK MESSAGE IN WIRELESS COMMUNICATION SYSTEM

(75) Inventors: Jin Young Chun, Anyang-si (KR); Wookbong Lee, Anyang-si (KR); Bin Chul Ihm, Anyang-si (KR)

(73) Assignee: LG Electronics Inc., Seoul (KR)

(*) Notice: Subject to any disclaimer, the term of this patent is extended or adjusted under 35 U.S.C. 154(b) by 281 days.

(21) Appl. No.: 12/656,613

(22) Filed: Feb. 4, 2010

(65) Prior Publication Data
US 2010/0202372 A1 Aug. 12, 2010

Related U.S. Application Data

(60) Provisional application No. 61/150,004, filed on Feb. 5, 2009, provisional application No. 61/164,472, filed on Mar. 30, 2009.

(30) Foreign Application Priority Data

Aug. 10, 2009 (KR) .................... 10-2009-0073276

(51) Int. Cl.
*H04L 12/56* (2006.01)
*H04J 1/16* (2006.01)

(52) U.S. Cl. ......... 370/278; 370/252; 370/329; 370/430
(58) Field of Classification Search .................. 370/252, 370/278, 329, 430
See application file for complete search history.

(56) References Cited

U.S. PATENT DOCUMENTS

| | | | |
|---|---|---|---|
| 2007/0232341 A1* | 10/2007 | Sakata | 455/509 |
| 2007/0287487 A1 | 12/2007 | Puig-Oses et al. | |
| 2008/0069031 A1 | 3/2008 | Zhang et al. | |
| 2008/0225792 A1 | 9/2008 | Naguib et al. | |

* cited by examiner

*Primary Examiner* — John Pezzlo
(74) *Attorney, Agent, or Firm* — McKenna Long & Aldridge LLP

(57) ABSTRACT

A method and apparatus of transmitting a feedback message in a wireless communication system is provided. A mobile station receives information on a first period and a second period from a base station and transmits a first feedback message in every first period or a second feedback message in every second period to the base station over a primary fast feedback channel (PFBCH). The first feedback message comprises a channel quality indicator (CQI) for a subband selected from a plurality of subbands, and the second feedback message comprises a subband index of the selected subband.

13 Claims, 31 Drawing Sheets

METHOD AND APPARATUS OF TRANSMITTING FEEDBACK MESSAGE IN WIRELESS COMMUNICATION SYSTEM

CROSS-REFERENCE TO RELATED APPLICATIONS

This application claims the benefit of priority of U.S. Provisional application No. 61/150,004 filed on Feb. 5, 2009, U.S. Provisional application No. 61/164,472 filed on Mar. 30, 2009, and Korean Patent application No. 10-2009-0073276 filed on Aug. 10, 2009, all of which are incorporated by reference in their entirety herein.

BACKGROUND OF THE INVENTION

1. Field of the Invention

The present invention relates to wireless communications, and more particularly, to a method and apparatus of transmitting a feedback message in a wireless communication system.

2. Related Art

The institute of electrical and electronics engineers (IEEE) 802.16e standard was adopted in 2007 as a sixth standard for international mobile telecommunication (IMT)-2000 in the name of 'WMAN-OFDMA TDD' by the ITU-radio communication sector (ITU-R) which is one of sectors of the international telecommunication union (ITU). An IMT-advanced system has been prepared by the ITU-R as a next generation (i.e., $4^{th}$ generation) mobile communication standard following the IMT-2000. It was determined by the IEEE 802.16 working group (WG) to conduct the 802.16m project for the purpose of creating an amendment standard of the existing IEEE 802.16e as a standard for the IMT-advanced system. As can be seen in the purpose above, the 802.16m standard has two aspects, that is, continuity from the past (i.e., the amendment of the existing 802.16e standard) and continuity to the future (i.e., the standard for the next generation IMT-advanced system). Therefore, the 802.16m standard needs to satisfy all requirements for the IMT-advanced system while maintaining compatibility with a mobile WiMAX system conforming to the 802.16e standard.

A multiple-input multiple-output (MIMO) technique improves efficiency of data transmission and reception by using multiple transmit (Tx) antennas and multiple receive (Rx) antennas. Ever since the MIMO technique was introduced from the IEEE 802.16a standard, the MIMO technique has been constantly updated up to now.

The MIMO technique can be classified into a spatial multiplexing technique and a spatial diversity technique. According to the spatial multiplexing technique, different pieces of data are simultaneously transmitted and thus data can be transmitted at a high speed without increasing a system bandwidth. According to the spatial diversity technique, the same data is transmitted through multiple Tx antennas to obtain diversity, thereby increasing data reliability.

A mobile station (MS) can transmit a feedback in uplink. The feedback includes channel information required for data transmission. By using the feedback received from the MS, a base station (BS) can schedule a radio resource and can transmit data. A closed-loop mode is a mode in which data is transmitted by compensating for channel information included in the feedback received from the MS. An open-loop mode is a mode in which data is transmitted without compensating for the channel information included in the feedback received from the MS. The feedback may not be transmitted in the open-loop mode. Even if the feedback is transmitted, the BS may not use the channel information included in the feedback. Generally, in the communication system, the open-loop mode can be used in a channel environment where the MS moves with a high speed, and the closed-loop mode can be used in a channel environment where the MS moves with a slow speed. More specifically, the open-loop mode is used when the MS moves with a high speed since a channel variation is significant and thus channel information including the feedback is unreliable. In addition, the closed-loop mode is used when the MS moves with a slow speed since a channel variation is relatively less significant and thus the channel information including the feedback is reliable and is less sensitive to delay.

Examples of a feedback message transmitted by the MS include a scheduling request that requests radio resource allocation such as a bandwidth request (BR), an acknowledgment (ACK)/negative-acknowledgment (NACK) signal that is a response for downlink data transmission, a channel quality indicator (CQI) that indicates downlink channel quality, MIMO information, etc.

However, when the MS generates and transmits independent feedback messages for the respective types of information (e.g., CQI, MIMO, etc.), many overheads are caused by limited radio resources. Therefore, there is a need for a method of effectively transmitting a feedback message by combining different types of channel information.

SUMMARY OF THE INVENTION

It is, therefore, an object of the present invention to provide a method and apparatus of transmitting a feedback message by a mobile station in a wireless communication system.

In an aspect, a method of transmitting a feedback message in a wireless communication system is provided. The method include receiving information on a first period and a second period from a base station, and transmitting a first feedback message in every first period or a second feedback message in every second period to the base station over a primary fast feedback channel (PFBCH), wherein the first feedback message comprises a channel quality indicator (CQI) for a subband selected from a plurality of subbands, and the second feedback message comprises a subband index of the selected subband. The number of the selected subband may be one. The CQI for the selected subband may be computed by adding an average measure of a CQI over the plurality of subbands and a differential CQI of the selected subband. The first feedback message and the second feedback message may be changed according to a value of Multiple-In Multiple-Out (MIMO) feedback mode. The transmitting of the first feedback message or the second feedback message may include selecting a sequence corresponding to the first feedback message or the second feedback message from a plurality of sequences, and transmitting the selected sequence by mapping the sequence to a symbol. The first feedback message may further include a precoding matrix index (PMI) or a rank. The second period may be a $2^n$ multiple of the first period (where n is a natural number). If a period of the first feedback message overlaps with a period of the second feedback message, the second feedback message may be transmitted. The method may further include receiving information on the selected subband from the base station.

In another aspect, a mobile station (MS) in a wireless communication system is provided. The MS include a radio frequency (RF) unit configured to transmit or receive a radio signal, and a processor coupled to the RF unit and configured to receive information on a first period and a second period from a base station, and transmit a first feedback message in every first period or a second feedback message in every second period to the base station, wherein the first feedback message comprises a channel quality indicator (CQI) for a subband selected from a plurality of subbands, and the second feedback message comprises a subband index of the selected subband. The number of the selected subband may be one. The first feedback message or the second feedback message may be transmitted over a primary fast feedback channel (PFBCH). If a period of the first feedback message overlaps with a period of the second feedback message, the second feedback message may be transmitted.

DESCRIPTION OF EXEMPLARY EMBODIMENTS

A technology below can be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented using radio technology, such as Universal Terrestrial Radio Access (UTRA) or CDMA2000. TDMA can be implemented using radio technology, such as Global System for Mobile communications (GSM)/General Packet Radio Service (GPRS)/Enhanced Data Rates for GSM Evolution (EDGE). OFDMA can be implemented using radio technology, such as IEEE 802.11 (Wi-Fi), IEEE 802.16 (WiMAX), IEEE 802-20, or Evolved UTRA (E-UTRA). IEEE 802.16m is the evolution of IEEE 802.16e, and it provides a backward compatibility with an IEEE 802.16e-based system. UTRA is part of a Universal Mobile Telecommunications System (UMTS). 3rd Generation Partnership Project (3GPP) Long Term Evolution (LET) is part of Evolved UMTS (E-UMTS) using Evolved-UMTS Terrestrial Radio Access (E-UTRA), and it adopts OFDMA in downlink (DL) and SC-FDMA in uplink (UL). LTE-A (Advanced) is the evolution of 3GPP LTE.

IEEE 802.16m is chiefly described as an example in order to clarify the description, but the technical spirit of the present invention is not limited to IEEE 802.16m.

Figure 1:
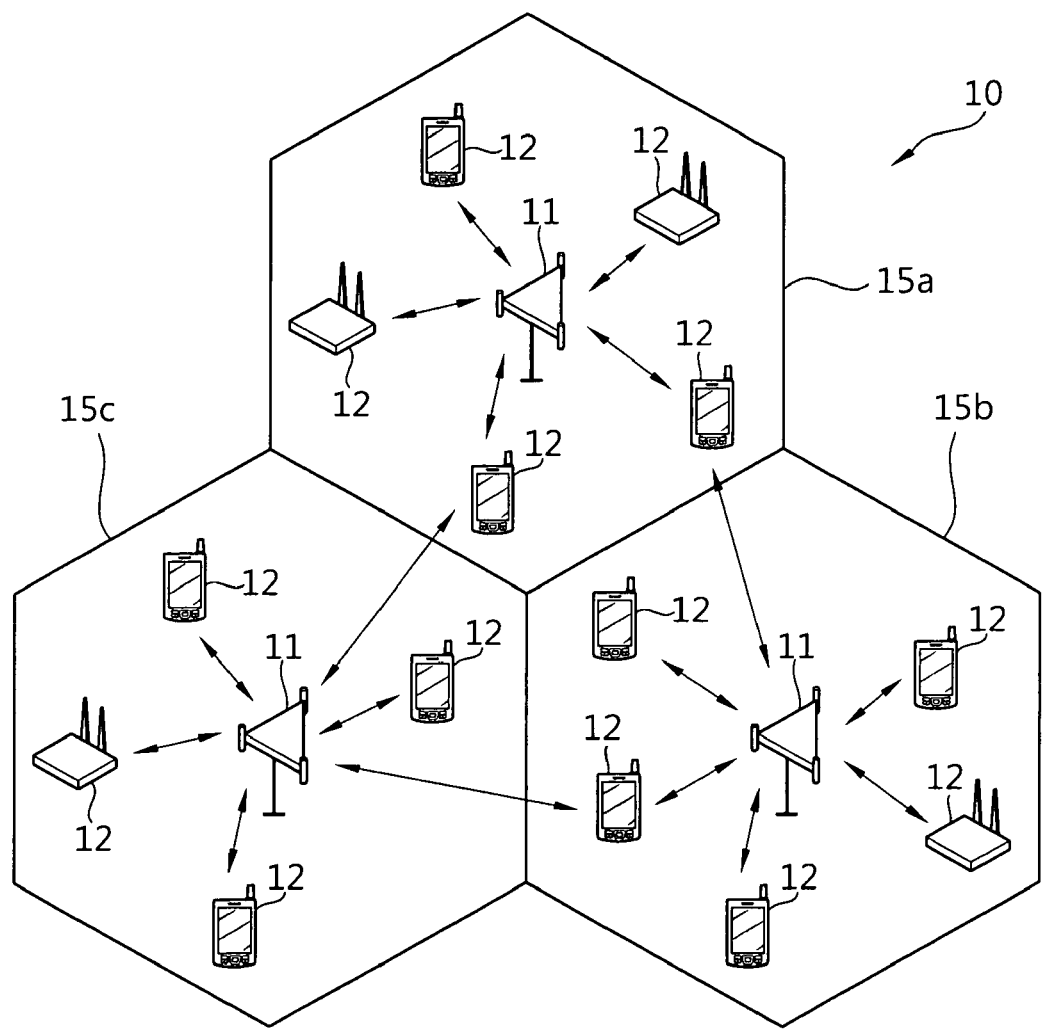
FIG. 1 shows a wireless communication system.

FIG. 1 shows a wireless communication system.

The wireless communication system 10 includes one or more Base Stations (BSs) 11. The BSs 11 provide communication services to respective geographical areas (in general called 'cells') 15a, 15b, and 15c. Each of the cells can be divided into a number of areas (called 'sectors'). A User Equipment (UE) 12 can be fixed or mobile and may be referred to as another terminology, such as a Mobile Station (MS), a Mobile Terminal (MT), a User Terminal (UT), a Subscriber Station (SS), a wireless device, a Personal Digital Assistant (PDA), a wireless modem, or a handheld device. In general, the BS 11 refers to a fixed station that communicates with the UEs 12, and it may be referred to as another terminology, such as an evolved-NodeB (eNB), a Base Transceiver System (BTS), or an access point.

The UE belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

Figure 2:
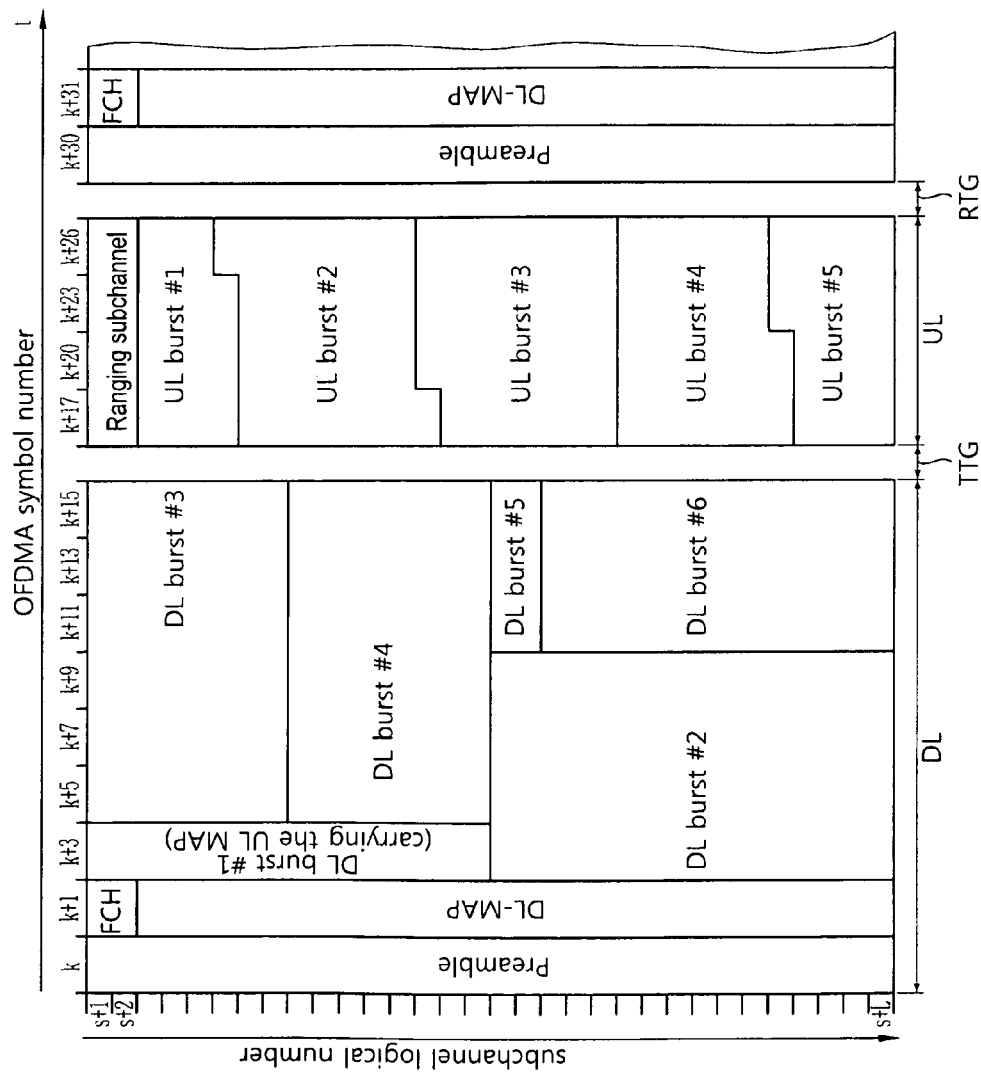
FIG. 2 shows an example of a frame structure.

FIG. 2 shows an example of a frame structure. A frame is a data sequence during a fixed time period used by physical specifications. For detailed information of the data sequence, reference can be made to Paragraph 8.4.4.2 of IEEE standard 802.16-2004 "Part 16: Air Interface for Fixed Broadband Wireless Access Systems".

Referring to FIG. 2, the frame includes a DL subframe and a UL subframe. In the Time Division Duplex (TDD) method, UL transmission and DL transmission share the same frequency, but are performed at different times. The DL subframe starts in order of a preamble, a Frame Control Header (FCH), a DL-MAP, a UL-MAP, and a burst region. A guard time for dividing the DL subframe and the UL subframe is inserted into a middle portion (between the DL subframe and the UL subframe) and the last portion (subsequent to the UL subframe) of the frame. A Transmit/receive Transition Gap (TTG) is placed between DL bursts and subsequent UL bursts. A Receive/transmit Transition Gap (RTG) is placed between UL bursts and a subsequent preamble.

The preamble is used for initial synchronization between a BS and a UE, cell search, a frequency offset, and channel estimation. The FCH includes information about the length of a DL-MAP message and the coding scheme of DL-MAP.

The DL-MAP is a region in which the DL-MAP message is transmitted. The DL-MAP message defines access to a DL channel. It is meant that the DL-MAP message defines an instruction or control information or both for the DL channel. The DL-MAP message includes a configuration change count and a BS Identifier (ID) of a Downlink Channel Descriptor (DCD). The DCD describes a DL burst profile that is applied to the current MAP. The DL burst profile refers to the characteristic of a DL physical channel, and the DCD is periodically transmitted by a BS through a DCD message.

The UL-MAP is a region in which a UL-MAP message is transmitted. The UL-MAP message defines access to a UL channel. It is meant that the UL-MAP message defines an instruction or control information or both for the UL channel. The UL-MAP message includes a configuration change count of an Uplink Channel Descriptor (UCD) and a UL allocation start time defined by the UL-MAP. The UCD describes a UL burst profile. The UL burst profile refers to the characteristic of a UL physical channel, and the UCD is periodically transmitted by a BS through an UCD message.

The DL burst is a region in which data transmitted from a BS to a UE are transmitted, and the UL burst is a region in which data transmitted from a UE to a BS are transmitted.

A fast feedback region is included in the UL burst region of an OFDM frame. The fast feedback region is used to transmit information that requires a fast response from a BS. The fast feedback region can be used for CQI transmission. The position of the fast feedback region is determined by the UL-MAP. The position of the fast feedback region can be fixed or variable within the OFDM frame.

Figure 3:
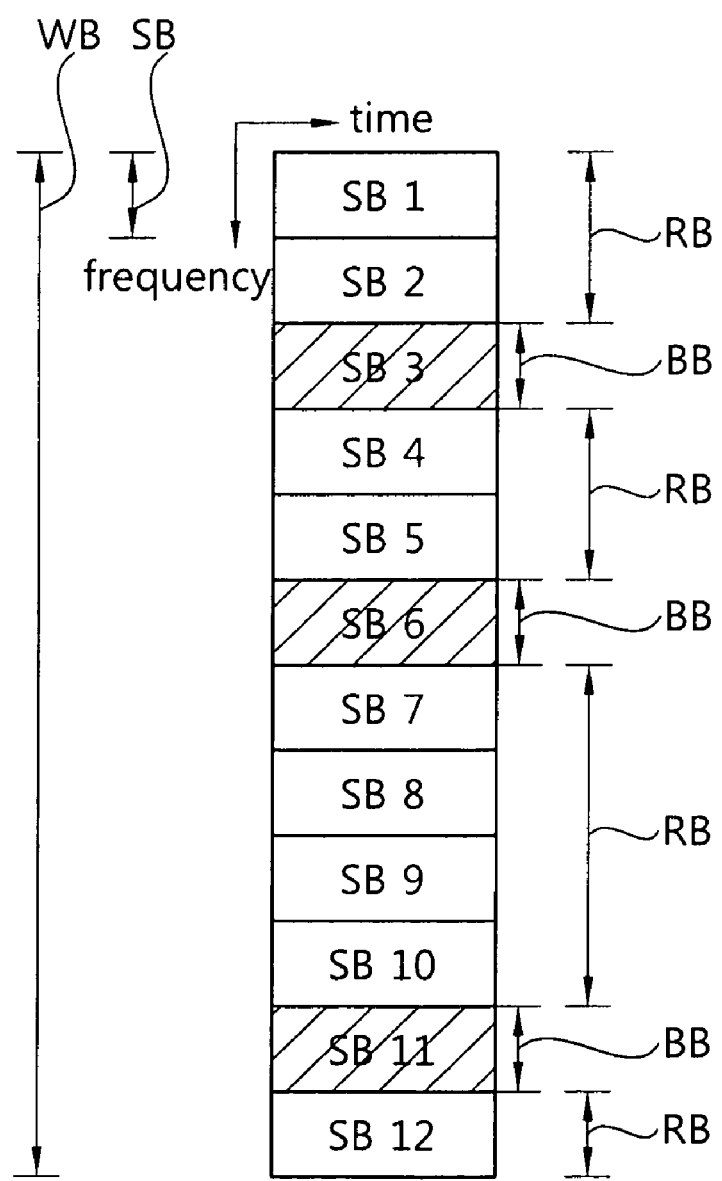
FIG. 3 shows an example of a frequency band.

FIG. 3 shows an example of a frequency band.

Referring to FIG. 3, a whole band denotes a whole frequency band and is divided into a plurality of subbands. Each subband is indicated by an 'SBn', where n denotes an index of each subband. The whole band can be divided into 12 subbands. However, the present invention is not limited thereto, and thus the whole band may be divided into more (or less) than 12 subbands.

Hereinafter, a Best-M method denotes a method in which M specific subbands are selected from a plurality of subbands. For example, M subbands having best channel conditions may be selected. A best band denotes the selected M subbands. A remaining band denotes subbands remaining after excluding the best band from the whole band. For example, in FIG. 3, subbands SB3, SB6, and SB11 are selected as the best band according to a Best-3 method.

A channel quality indicator (CQI) can be obtained for each subband. In addition, a codebook index included in MIMO information also can be obtained for each subband. A subband for obtaining the codebook index does not necessarily have to coincide with a subband for obtaining the CQI. For example, the number of subcarriers included in a subband used to obtain the MIMO information may be greater than the number of subcarriers included in a subband used to obtain the CQI.

As such, various subbands are used to reduce an overhead caused by a feedback so that smooth communication is achieved between a BS and an MS. In addition, the various subbands are used to effectively transmit a feedback message. The aforementioned manner of dividing the whole band into subbands is for exemplary purposes only. Thus, the number of subbands and the size of each subband may vary.

The feedback message may be transmitted through an uplink control channel.

Figure 4:
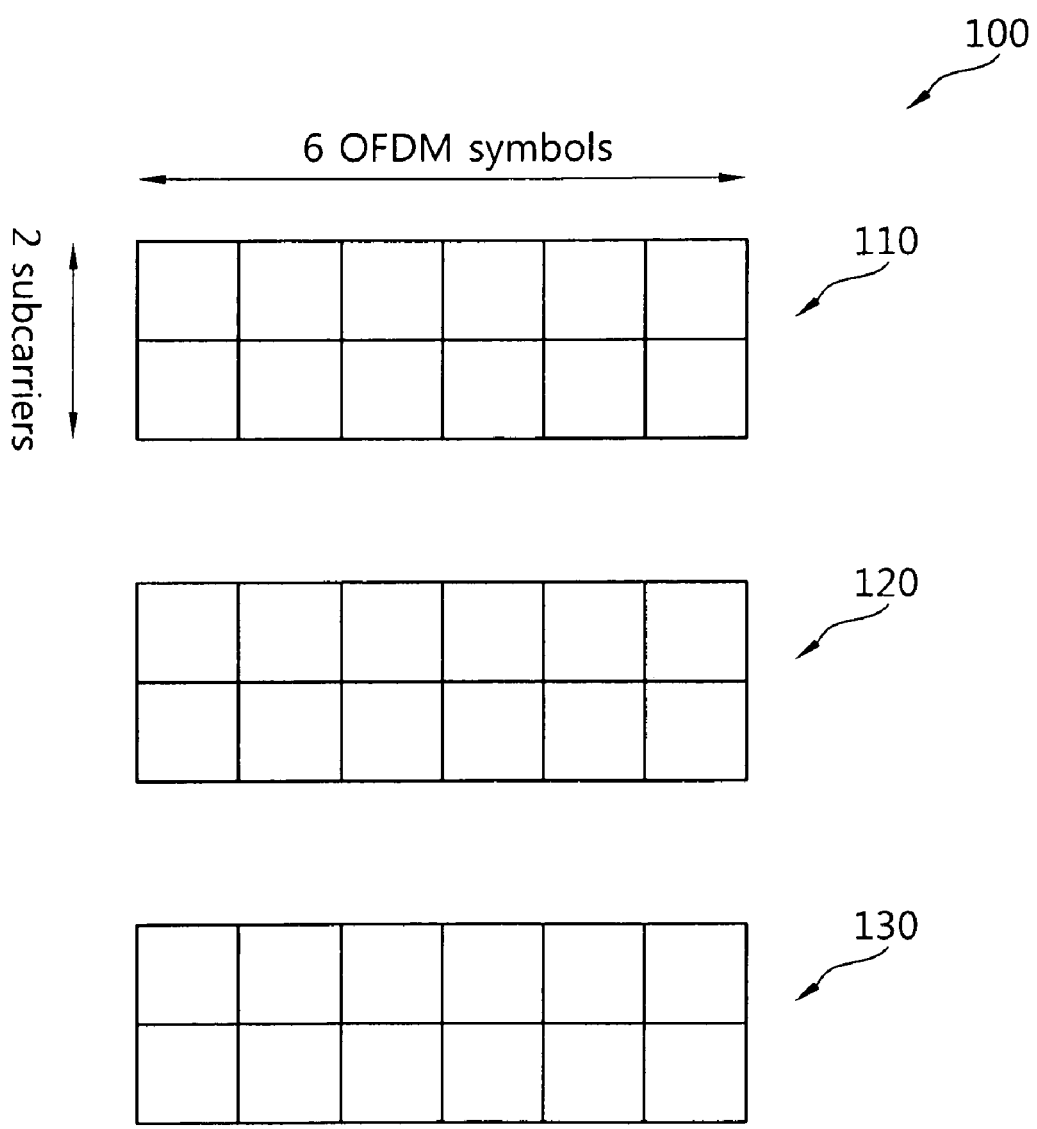
FIG. 4 shows an example of a resource unit used for an uplink control channel in an institute of electrical and electronics engineers (IEEE) 802.16m system.

FIG. 4 shows an example of a resource unit used for an uplink control channel in an IEEE 802.16m system. A resource unit 100 is a resource allocation unit used for transmission of an uplink control channel, and is also referred to as a tile. The tile 100 may be a physical resource allocation unit or a logical resource allocation unit. The control channel includes at least one tile 100, and the tile 100 consists of at least one frequency-domain subcarrier over at least one time-domain OFDM symbol. The tile 100 denotes an aggregation of a plurality of subcarriers contiguous along a time domain and a frequency domain. The tile 100 includes a plurality of data subcarriers and/or pilot subcarriers. A sequence of a control signal may be mapped to the data subcarrier, and a pilot for channel estimation may be mapped to the pilot subcarrier.

The tile 100 includes three mini units 110, 120, and 130. The mini unit is also referred to as a mini tile. The tile 100 may consist of a plurality of mini tiles. The mini tile may consist of at least one frequency-domain subcarrier over at least one time-domain OFDM symbol. Each of the mini tiles 110, 120, and 130 includes two contiguous subcarriers throughout 6 OFDM symbols. The mini tiles 110, 120, and 130 included in the tile 100 may not be contiguous to one another in the frequency domain. This implies that at least one mini tile of another tile may be located between the $1^{st}$ mini tile 110 and the $2^{nd}$ mini tile 120 and/or between the $2^{nd}$ mini tile 120 and the $3^{rd}$ mini tile 130. Frequency diversity can be obtained by locating the mini tiles 110, 120, and 130 included in the tile 100 in a distributive manner.

The number of time-domain OFDM symbols and/or the number of frequency-domain subcarriers included in the mini tile are for exemplary purposes only, and thus the present invention is not limited thereto. The mini tile may include a plurality of subcarriers throughout a plurality of OFDM symbols. The number of OFDM symbols included in the mini tile may differ according to the number of OFDM symbols included in a subframe. For example, if the number of OFDM symbols included in one subframe is 6, the number of OFDM symbols included in a mini tile may be 6.

The OFDM symbol denotes a duration in the time domain, and is not necessarily limited to an OFDM/OFDMA-based system. The OFDM symbol may also referred to as other terms such as a symbol duration. Technical features of the present invention are not limited to a specific multiple access scheme by the term of the OFDM symbol. In addition, the subcarrier denotes an allocation unit in the frequency domain. Although one subcarrier is used for this unit herein, a subcarrier set unit may be used.

Examples of the uplink control channel used in the IEEE 802.16m system include a fast feedback channel (FFBCH), a hybrid automatic repeat request (HARQ) feedback control channel (HFBCH), a sounding channel, a ranging channel, a bandwidth request channel (BRCH), etc. The FFBCH carries a feedback of CQI and/or MIMO information, and is classified into two types, i.e., a primary fast feedback channel (PFBCH) and a secondary fast feedback channel (SFBCH). The PFBCH carries 4 to 6-bit information, and provides a wideband CQI and/or a MIMO feedback. The SFBCH carries 7 to 24-bit information, and provides a narrowband CQI and/or a MIMO feedback. The SFBCH can support a larger number of control information bits by using a high code rate. The PFBCH supports non-coherent detection not using a reference signal. The SFBCH supports coherent detection using the reference signal.

The FFBCH may be assigned to a predetermined location defined in a broadcast message. The FFBCH may be assigned periodically to an MS. Feedback information of a plurality of MSs may be transmitted through the FFBCH by performing multiplexing according to time division multiplexing (TDM), frequency division multiplexing (FDM), and code division multiplexing (CDM). The FFBCH through which an ACK/NACK signal is transmitted in response to data to which an HARQ scheme is applied may start at a pre-defined offset from data transmission.

Figure 5:
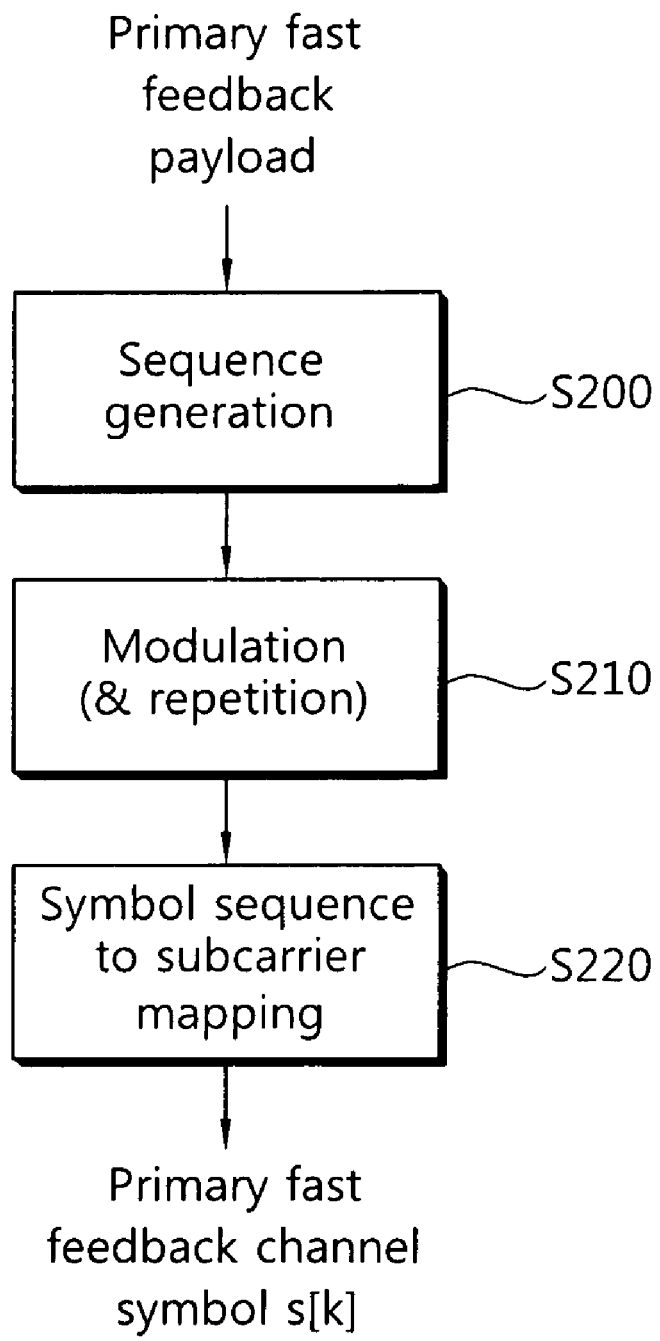
FIG. 5 is a flowchart showing a process of mapping information to a primary fast feedback channel (PFBCH).

FIG. 5 is a flowchart showing a process of mapping information to a PFBCH. In step S200, a codeword is generated by using a payload of a primary fast feedback. If information bit has a length of 6 bits, a 12-bit codeword is generated. The codeword may be selected from a predetermined codeword set. In step S210, the codeword is modulated to generate a modulated symbol set consisting of a plurality of modulated symbols. In step S220, the modulated symbol set is mapped to a data subcarrier of data PFBCH feedback mini-tile (FMT) to create a PFBCH symbol, and thereafter PFBCH transmission is performed.

Figure 6:
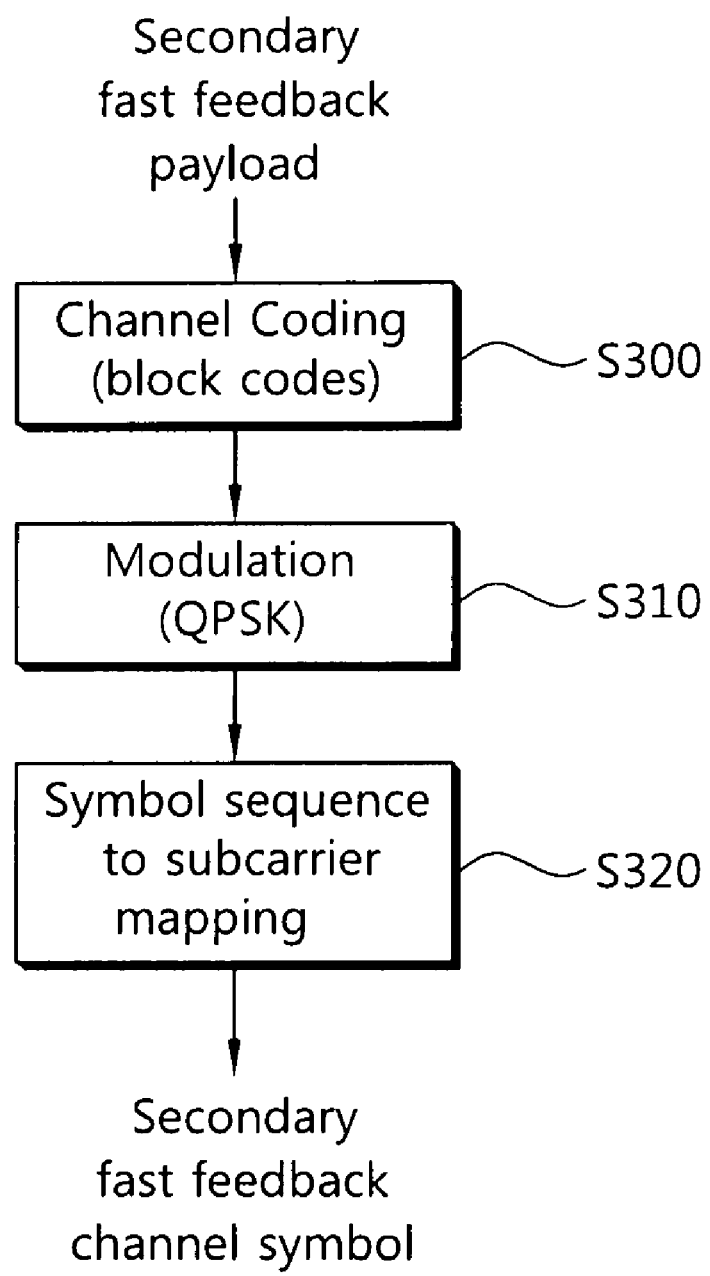
FIG. 6 is a flowchart showing a process of mapping information to a secondary fast feedback channel (SFBCH).

FIG. 6 is a flowchart showing a process of mapping information to an SFBCH. In step S300, a payload of a secondary fast feedback is channel-coded by using a convolutional code. In this case, a coding process may differ depending on a length of the payload. In step S310, QPSK modulation is performed on the channel-coded symbol. In step S320, the modulated symbol is combined with a pilot sequence to create one symbol sequence. The symbol sequence is mapped to a data subcarrier of a data SFBCH FMT to create an SFBCH, and thereafter SFBCH transmission is performed.

A feedback message may include feedback contents as follows.

1) MIMO mode: it can report various MIMO-related information such as open-loop/closed-loop feedback type, the number of users of a single user/multi user environment, space-frequency block code (SFBC), spatial-multiplexing (SM), etc.

2) rank: it is the number of independent channels in a MIMO system, and can be defined by the number of multiplexable spatial streams. The rank may also be referred to as a space-time coding (STC) rate. A length of rank information may differ depending on a rank number. For example, if the rank is 2, the rank information may have a length of 1 bit, if the rank is 4, the rank information may have a length of 2 bits, and if the rank is 8, the rank information may have a length of 3 bits.

3) carrier-to-interference-and-noise ratio (CINR): the CINR is one type of CQI, and indicates channel state information. The CINR includes a wideband CINR indicating channel state information of a whole band and a narrowband CINR indicating channel state information of some parts of the whole band. The narrowband CINR may be expressed by a difference value with respect to the wideband CINR or may be expressed by an average value of narrowband CINRs and difference values with respect thereto. The difference value may be one of $\{-1, 0, 1, 2\}$. The CINR has a length of 4 bits in general. However, if the narrowband CINR is expressed by a difference value, the CINR may have a length of 2 bits.

4) precoding matrix index (PMI): it is also referred to as a codebook index, and is either a wideband PMI or a narrowband PMI. If the rank is 2, the PMI may have a length of 3 bits, if the rank is 4, the PMI may have a length of 4 or 6 bits, and if the rank is 8, the PMI may have a length of 4 or 6 bits.

5) subband index: it indicates an index of a selected subband if narrowband information is fed back. If the number of subbands is 12, 12 bits are required when expressed by a bitmap, and when only possible combinations are used, 4 bits are required in case of using a Best-1 method, and 8 bits are required in case of using a Best-3 method. If the number of subbands is 24, 24 bits are required when expressed by a bitmap, and when only possible combinations are used, 5 bits are required in case of using the Best-1 method, and 11 bits are required in case of using the Best-3 method.

6) bandwidth request indicator (BRI): the BRI is transmitted through a feedback channel when an MS assigned with a feedback channel requests a bandwidth.

Figure 7:
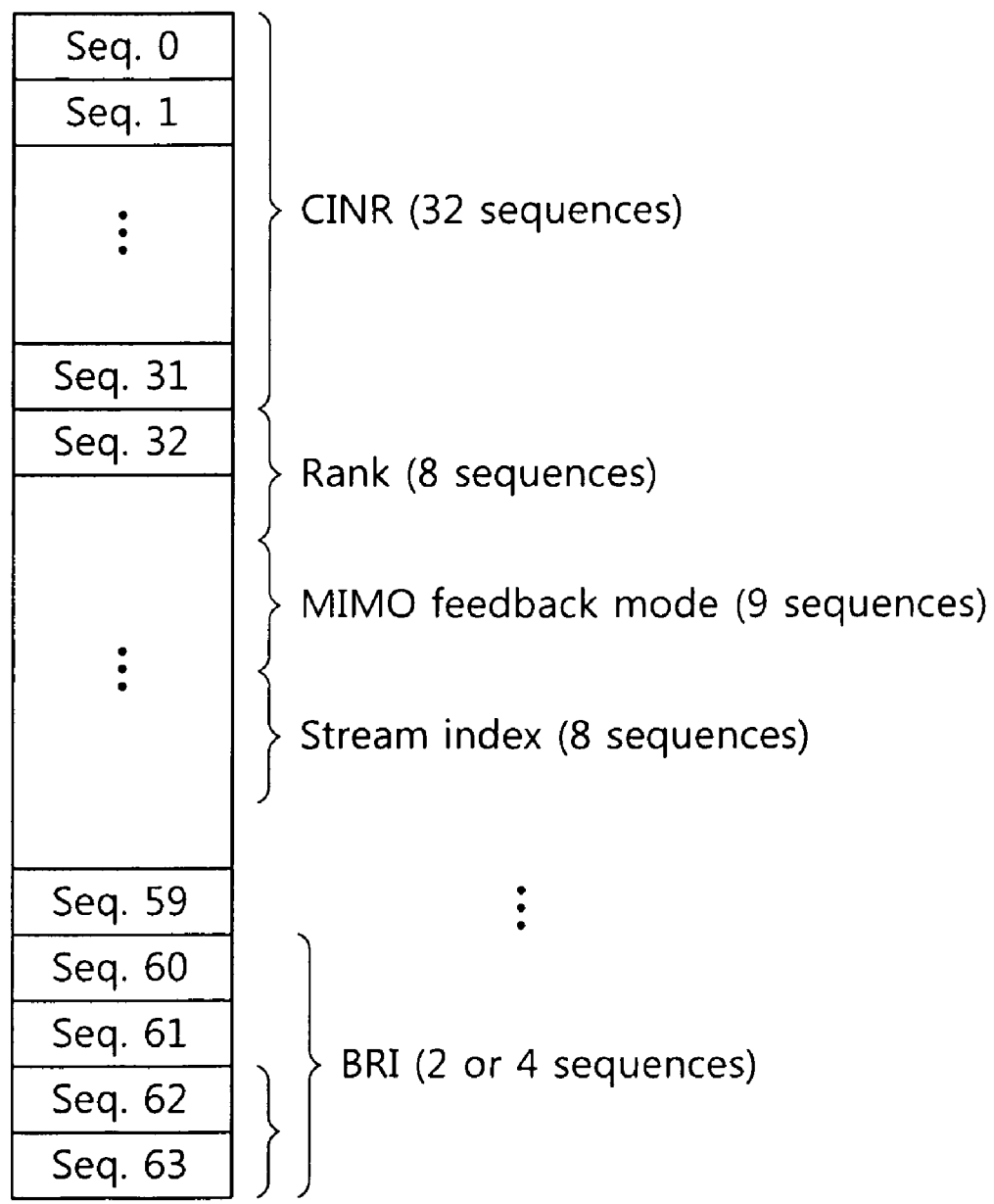
FIG. 7 shows an example of sequence mapping of feedback contents when a feedback message is transmitted through a PFBCH.

FIG. 7 shows an example of sequence mapping of feedback contents when a feedback message is transmitted through a PFBCH.

Referring to FIG. 7, the PFBCH has 64 sequences, and thus 6-bit information can be transmitted. The 64 sequences can be shared in transmission of the feedback contents such as a CINR, a MIMO feedback mode, a BRI, etc.

The sequences 0 to 31 are mapped with a CINR, and occupy 32 sequences (or 5 bits). The CINR may be either a wideband CINR or a CINR of Best-1.

The sequences 32 to 39 are mapped with a rank, and occupy 8 sequences.

The sequences 40 to 48 are mapped with a MIMO mode, and occupy 9 sequences.

The sequences 49 to 56 are mapped with a stream index, and occupy 8 sequences.

The sequences 60 to 63 or the sequences 62 to 63 are mapped with a BRI, and occupy 2 to 4 sequences (or 1 or 2 bits). Although one BRI is used in general, a plurality of BRIs can be used according to a service type. For example, a BRI 0 may be defined for a real-time service, and a BRI 1 may be defined for a non-real time service.

In addition thereto, feedback contents such as an Alt2, a PMI, a subband index, etc., may be included. The Alt2 may include information such as a diversity mode, a localized mode, etc. The PMI may be either a wideband PMI or a PMI of Best-1, and may have a length of 3, 4, or 6 bits. The subband index may indicate a location of Best-1 among several subbands, and if only possible combinations are used, 4 bits are required when the number of subbands is 12, and 5 bits are required when the number of subbands is 24.

The SFBCH is less robust than the PFBCH, but can transmit a more amount of feedbacks of up to 7 to 24 bits. All feedback contents transmitted through the PFBCH may also be transmitted through the SFBCH. Further, a narrowband CINR may be transmitted. 12 bits (i.e., 4 bits×3) are required when using all CINRs of Best-3. 6 bits (i.e., 2 bits×3) are required when using a difference value ΔCINR with respect to the wideband CINR. 10 bits (i.e., 4 bits+2 bits×3) are used when using an average value of the narrowband CINR and a difference value thereof. When the narrowband PMI is transmitted, 3, 4, or 6 bits are required for each subband of Best-3, and thus 9, 12, or 18 bits are required to transmit all narrowband PMIs. In addition, when transmitting a BRI of Best-3, 8 bits are required if the number of subbands is 12, and 11 bits are required if the number of subbands is 24. If a PMI mode is a differential mode, a differential PMI can be transmitted. The differential PMI has a similar length as the PMI.

A MAC message may transmit a PMI of a neighbor cell and information on an adaptive mode. A sounding channel may transmit PMI information or the like.

Figure 8:
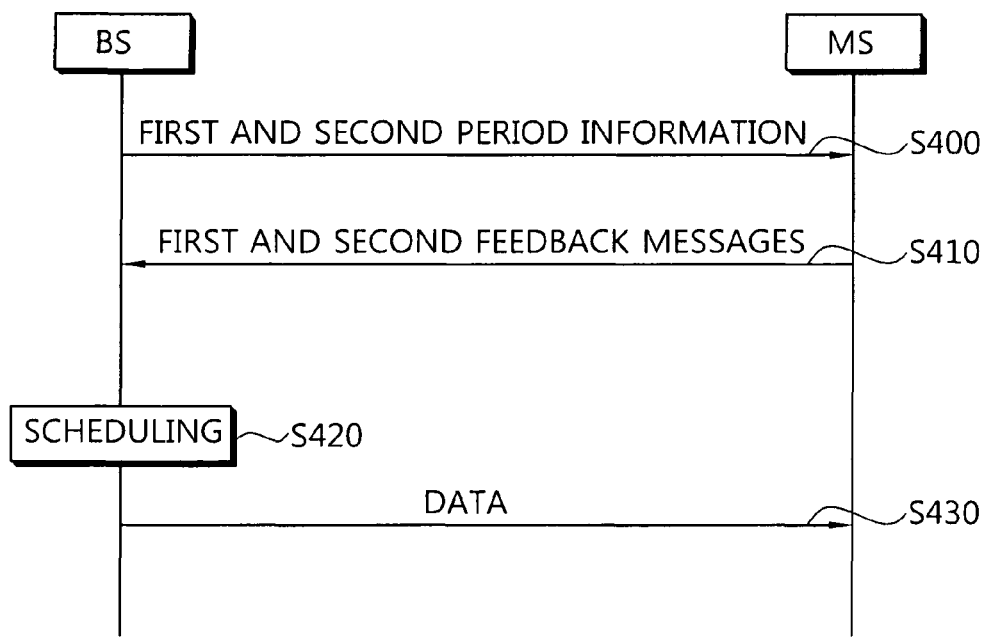
FIG. 8 shows an example of a feedback message transmission method proposed in the present invention.

FIG. 8 shows an example of a feedback message transmission method proposed in the present invention.

In step S400, an MS receives information on a first period and a second period from a BS. The information on the first period and the second period may be included in feedback allocation information for scheduling a feedback message to be transmitted by the MS.

In step S410, the MS transmits a first feedback message in every first period or a second feedback message in every second period to the BS over a PFBCH. The second period may be a $2^n$ multiple of the first period (where n is a natural number). The first feedback message may include a CQI, PMI, or rank which need to be frequently fed back at a short period according to a channel environment. The second feedback message may include a rank, subband index, or the like which is less frequently fed back than the first feedback message. Meanwhile, event-driven feedback contents are feedback contents transmitted when a MIMO mode changes or when a new bandwidth is requested. The event-driven contents are transmitted in accordance with a long period in general. However, since a feedback mechanism needs to change if single user (SU)/multi user (MU), wideband (WB)/narrow band (NB), or the like changes, feedback allocation information needs to be newly transmitted from the BS.

A transmission period of the first feedback message may overlap with a transmission period of the second feedback message. In this case, transmission of the second feedback message overrides transmission of the first feedback message. In addition, if there is a need to transmit the event-driven feedback contents at a transmission time of the second feedback message, transmission of the event-driven contents overrides transmission of the second feedback message.

Meanwhile, the first feedback message may include a CQI of a subband selected from a plurality of subbands, and the second feedback message may include a subband index of the selected subband among the plurality of subbands. The selected subband may conform to the Best-1 method. Among MSs, there may be an MSs which requires narrowband information because the MS is located in a cell edge and thus is in a poor channel environment. Therefore, for such an MS, narrowband information needs to be fed back through an SFBCH. However, if the MS in the poor channel environment transmits the SFBCH, a probability of error occurrence increases. For this reason, the narrowband information may be transmitted through a PFBCH for such an MS. In order to transmit the narrowband information through the PFBCH, the MS may further receive information on the selected subband (e.g., a MIMO feedback mode, a feedback format, etc.) from the BS by using the feedback allocation information.

In step S420, the BS schedules a transmission format, power, transmission rate, or the like by using the received feedback message. In step S430, data processed using the determined transmission format, power, transmission rate, or the like is transmitted to the MS.

Figure 9:
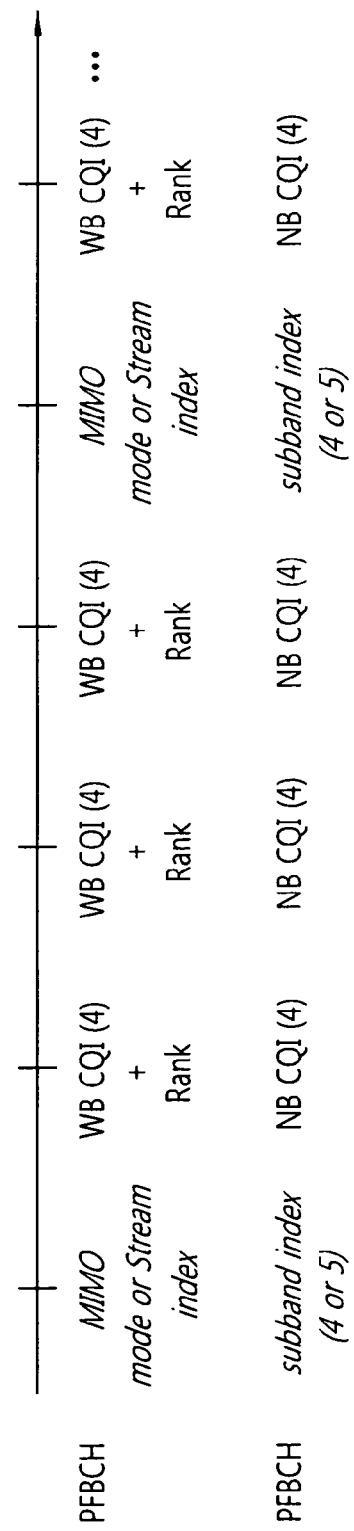
FIG. 9 shows another example of a feedback message transmission method proposed in the present invention.

FIG. 9 shows another example of a feedback message transmission method proposed in the present invention.

Over a first PFBCH, an MS transmits a first feedback message including a 4-bit wideband CQI and a rank in every frame, and prior to this transmission, a second feedback message including a MIMO mode and/or a stream index is transmitted in every 4 frames. Over a second PFBCH, the MS transmits a first feedback message including a 4-bit narrowband CQI in every frame, and prior to this transmission, a second feedback message including a 4 or 5-bit subband index is transmitted in every 4 frames.

Figure 10:
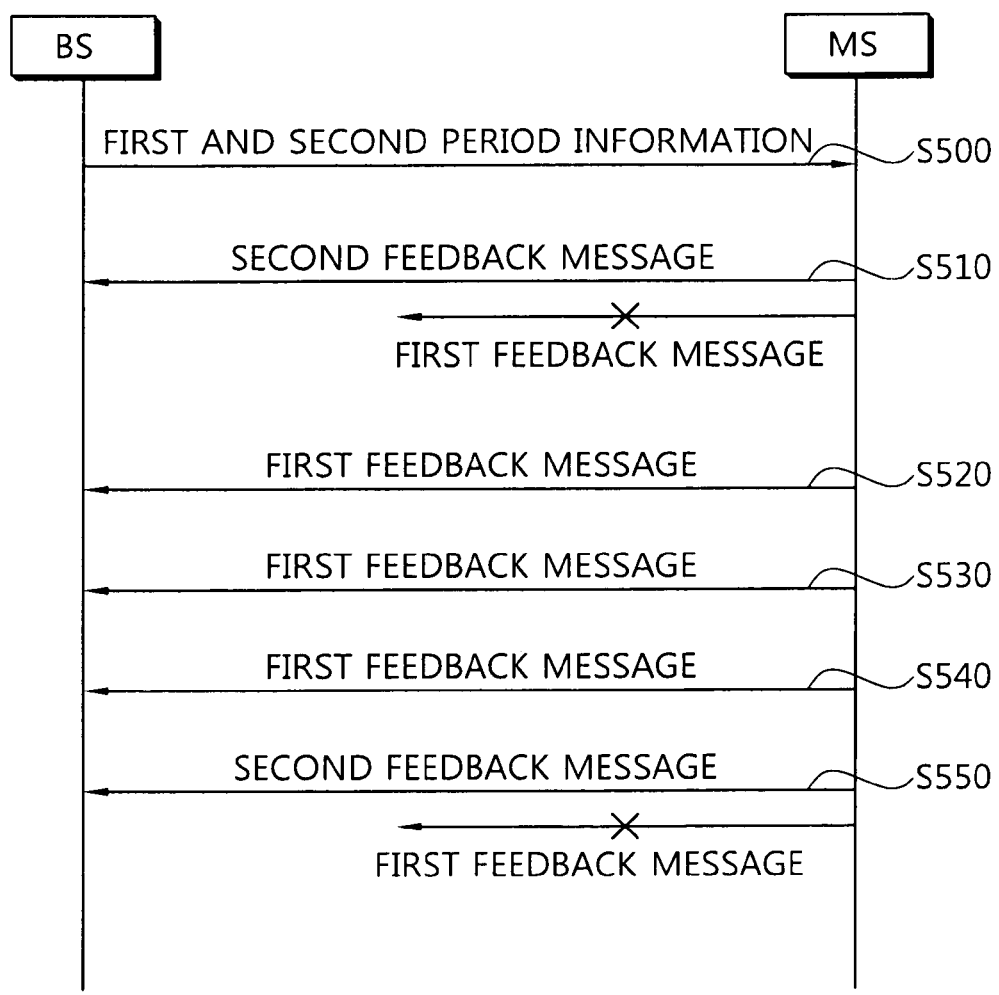
FIG. 10 shows another example of a feedback message transmission method proposed in the present invention.

FIG. 10 shows another example of a feedback message transmission method proposed in the present invention. The second PFBCH of FIG. 8 is used in this embodiment.

In step S500, an MS receives information on a first period and a second period from a BS. In step S510, the MS transmits a second feedback message including a subband index to the BS. The second feedback message is transmitted in every 4 frames, and this transmission overrides transmission of a first feedback message in step S510. In step S520 to step S540, the MS transmits the first feedback message including a 4-bit narrowband CQI in every first period to the BS. The first period is one frame. In step S550, the MS transmits again the second feedback message including a subband index prior to the transmission of the first feedback message.

Hereinafter, various configurations of a feedback message will be described according to embodiments of the present invention.

Feedback allocation information may include the following information.

1) MS_ID: it is an identification (ID) of an MS receiving the feedback allocation information, and may be transmitted by being masked onto a cyclic redundancy check (CRC) or by using data.

2) feedback channel type: A channel for transmitting a feedback message by the MS is determined. For example, a sounding channel, a fast feedback channel, and a MAC message may respectively have values of 00, 01, and 02.

3) channel index: it determines a location of each feedback channel in a frequency domain. For example, the channel index may indicate a feedback channel index if a feedback channel is an FFBCH, may indicate a sequence index if the feedback channel is a sounding channel, and may indicate an uplink (UL) distributed logical resource unit (LRU) index if the feedback channel is a MAC message. The channel index may have a one-to-one relation with the MS.

4) short-term feedback period: it is a period of a feedback message basically transmitted by the MS, and the feedback message may be transmitted in every $2^p$ frame with a period of the feedback message. In addition, when a plurality of feedback messages each having a different period are transmitted through one feedback channel, a period of the transmitted feedback message may be determined to the short-term feedback period.

5) long-term feedback period: when a plurality of feedback messages each having a different period are transmitted through one feedback channel, a period of the transmitted feedback message may be determined to the long-term period. The long-term period feedback message can be transmitted in every $2^q$ frame.

Table 1 shows an example of the short-term feedback period and the long-term feedback period.

TABLE 1

| classification | value | period |
|---|---|---|
| short-term feedback period | 00 | $1^{st}$ frame |
| | 01 | $2^{nd}$ frame |
| | 10 | $4^{th}$ frame |
| | 11 | $8^{th}$ frame |
| long-term feedback period | 00 | $2^{nd}$ frame |
| | 01 | $4^{th}$ frame |
| | 10 | $8^{th}$ frame |
| | 11 | $16^{th}$ frame |

Referring to Table 1, the long-term feedback period cannot be less than the short-term feedback period. The long-term feedback period may be a $2^n$ multiple of the short-term feedback period (where n is a natural number).

6) frame offset: it determines a specific uplink subframe or frame in which a feedback message is transmitted after the MS receives the feedback allocation information.

7) allocation duration: it determines a duration of a feedback channel. The duration can be determined to be permanent until a BS transmits a feedback channel release command.

8) MIMO feedback mode (MFM): the feedback mode is determined by MIMO information such as open-loop (OL)/closed-loop (CL) feedback type, the number of users of a single user (SU)/multi user (MU) environment, etc. In addition, whether to transmit wideband information or narrowband information can be determined by the MIMO feedback mode.

9) feedback format: it determines a channel for transmitting a feedback message and feedback contents (e.g., CQI, PMI, etc.) included in the feedback message. In addition, if the feedback message transmits narrowband information, the suffix M of the Best-M method is determined. M may be any value in the range of 1 to 6.

The feedback allocation information may have a different configuration according to the number of channels allocated to one piece of feedback allocation information and the number of feedback messages that can be collectively transmitted.

Table 2 shows an exemplary configuration of feedback allocation information when only one channel can be allocated to one piece of feedback allocation information and up to two feedbacks can be transmitted according to a MIMO mode.

TABLE 2

| | |
|---|---|
| channel index | index of FFBCH to be transmitted by MS |
| UL subframe offset (n) | when MS receives feedback allocation information, feedback starts after $n^{th}$ UL subframe |
| CINR type | 0: physical CINR, 1: effective CINR |
| long-term period | period in which rank, MIMO mode, or stream index is transmitted rank: 8 types (1 to 8) MIMO mode: 9 types (OL-SU(Wideband), OL-SU(Narrowband), OL-MU(rank2), OL-MU(rank3), OL-MU(rank4), CL-SU, CL-MU(rank2), CL-MU(rank3), CL-MU(rank4) stream index: 8 types (1 to 8) |
| short-term period | period in which wideband CINR is transmitted |

Referring to Table 2, one feedback channel is allocated to one pieces of feedback allocation information when transmitted. In general, in a first feedback channel, a rank and/or a MIMO mode may be transmitted using a long-term period feedback message, and a wideband CINR may be transmitted using short-term feedback message.

Table 3 shows an exemplary configuration of additional feedback allocation information for transmitting a second feedback when only one channel can be allocated to one piece of feedback allocation information and up to two feedbacks can be transmitted according to the MIMO mode. That is, the feedback messages are collectively transmitted according to the feedback allocation information of Table 2 above and Table 3 below.

TABLE 3

| | |
|---|---|
| channel index | index of FFBCH to be transmitted by MS |
| UL subframe offset (n) | when MS receives feedback allocation information, feedback starts after $n^{th}$ UL subframe |
| feedback mode | 0. open loop (narrowband, Best-M, M = 1) 1. open loop (narrowband, Best-M, M > 1) 2. closed loop (narrowband, Best-M, M = 1) 3. closed loop (narrowband, Best-M, M > 1) |
| CINR type | 0: physical CINR, 1: effective CINR |
| codebook subset | 0: enable, 1: disable |
| PMI feedback mode | 0: standard mode, 1: differential mode |
| long-term period | period for transmitting long-term period feedback message |
| short-term period | period for transmitting short-term period feedback message |

Referring to Table 3, a feedback message to be transmitted by the MS may vary depending on the feedback mode. If the feedback message has a size of 4 to 6 bits, the feedback message is transmitted using a PFBCH. If the feedback message has a size of 7 to 24 bits, the feedback message is transmitted using an SFBCH.

Figure 16:
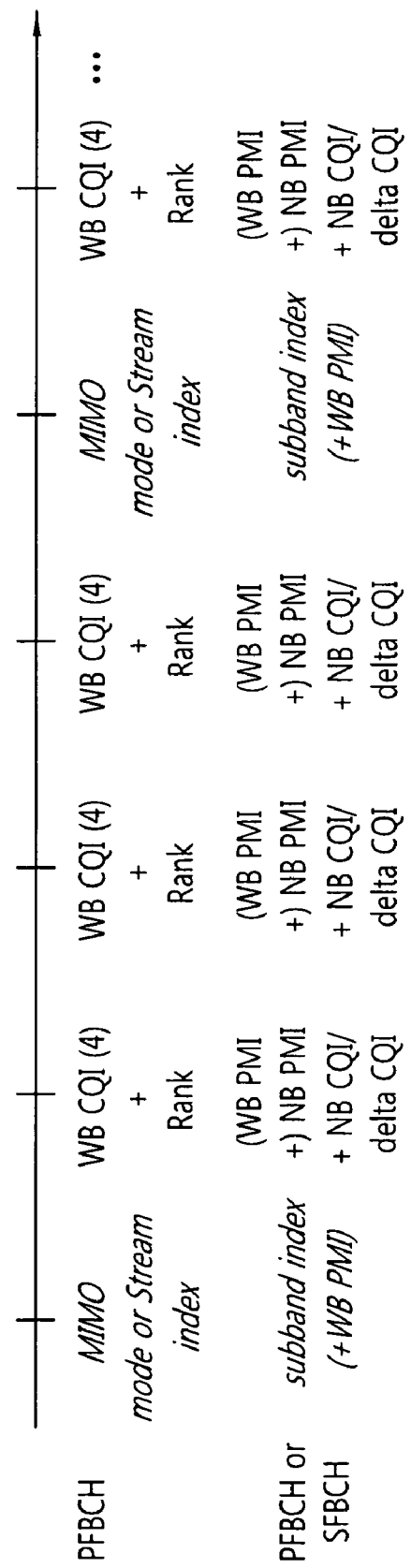
FIG. 16 shows another embodiment of a feedback message transmission method in a narrowband feedback (Best-M, M=1) mode in which a PMI is included.
Figure 18:
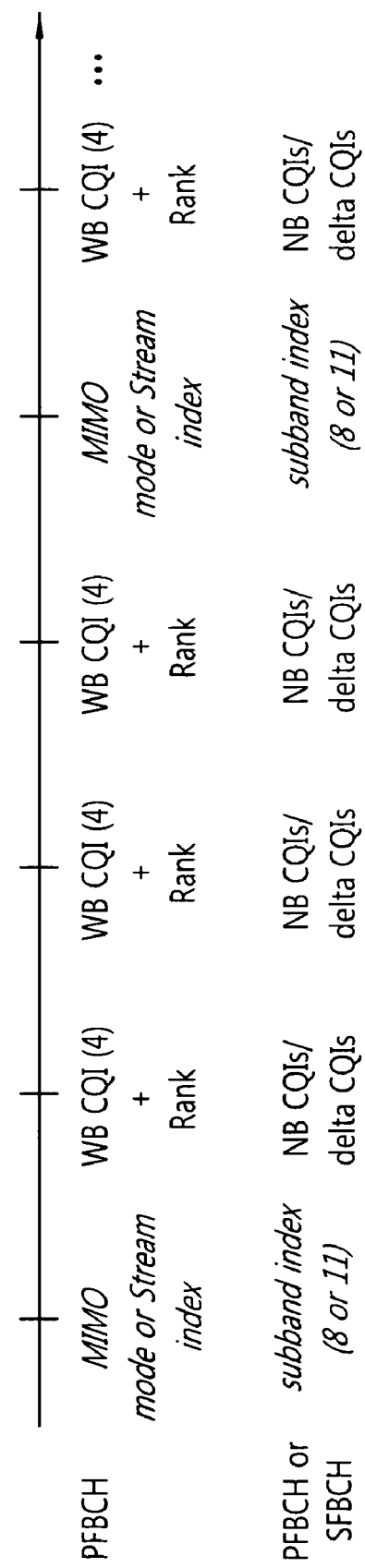
FIG. 18 shows another embodiment of a feedback message transmission method in a narrowband feedback (Best-M, M=3) mode in which a PMI is not included.
Figure 21:
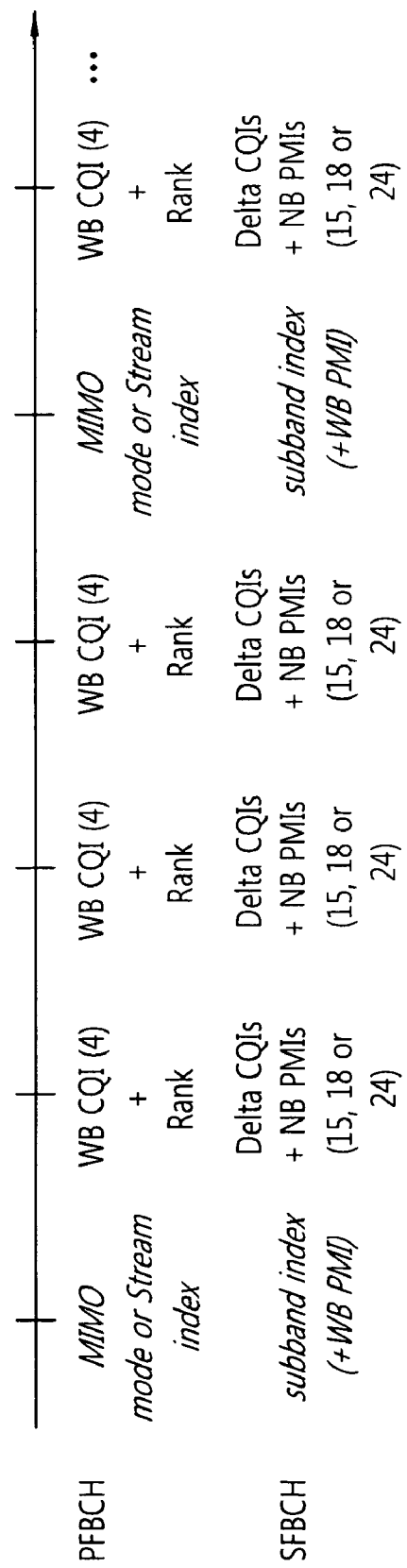
FIG. 21 shows another embodiment of a feedback message transmission method in a narrowband feedback (Best-M, M=3) mode in which a PMI is included.

An embodiment of a feedback message transmission method in the feedback mode 0 is shown in FIG. 9, and an embodiment of a feedback message transmission method in the feedback mode 1 is shown in FIG. 18 to be described below. In addition, an embodiment of a feedback message transmission method in the feedback mode 2 is shown in FIG. 16 to be described below, and an embodiment of a feedback message transmission method in the feedback mode 3 is shown in FIG. 21 to be described below.

Table 4 shows an exemplary configuration of feedback allocation configuration when two channels can be allocated to one piece of feedback allocation information and up to two feedbacks can be transmitted according to the MIMO mode.

TABLE 4

| | |
|---|---|
| CINR type | 0: physical CINR, 1: effective CINR |
| codebook subset | 0: enable, 1: disable |
| PMI feedback mode | 0: standard mode, 1: differential mode |
| feedback channel number (C) | the number of feedback channels |
| For (i=0; i<C;i++){ | |
| channel index | index of FFBCH to be transmitted by MS |
| UL subframe offset (n) | when MS receives feedback allocation information, feedback starts after $n^{th}$ UL subframe |
| If (i=0){ } | first channel is transmitted in a default mode |
| Else{ feedback mode | second channel is transmitted according to feedback mode |
| } | 0. open loop (narrowband, Best-M, M = 1) |
| | 1. open loop (narrowband, Best-M, M > 1) |
| | 2. closed loop (narrowband, Best-M, M = 1) |
| | 3. closed loop (narrowband, Best-M, M > 1) |
| long-term period | period for transmitting long-term period feedback message |
| short-term period | period for transmitting short-term period feedback message |
| } | |

Referring to Table 4, one feedback channel is basically created irrespective of the MIMO mode, and one feedback channel can be further added according to the MIMO mode. In general, in a first feedback channel, the MIMO mode is transmitted using a long-term period feedback message, and a wideband CINR or a rank may be transmitted using a short-term period feedback message. In a second feedback channel, a feedback message to be transmitted varies according to the feedback mode.

An embodiment of a feedback message transmission method in the feedback mode 0 is shown in FIG. 9, and an embodiment of a feedback message transmission method in the feedback mode 1 is shown in FIG. 18 to be described below. In addition, an embodiment of a feedback message transmission method in the feedback mode 2 is shown in FIG. 16 to be described below, and an embodiment of a feedback message transmission method in the feedback mode 3 is shown in FIG. 21 to be described below.

Table 5 shows an exemplary configuration of feedback allocation information when only one channel can be allocated to one piece of feedback allocation information and only one feedback can be transmitted irrespective of the MIMO mode.

TABLE 5

| | |
|---|---|
| channel index | index of FFBCH to be transmitted by MS |
| UL subframe offset (n) | when MS receives feedback allocation information, feedback starts after $n^{th}$ UL subframe |
| feedback mode | 0. open loop (wideband) |
| | 1. open loop (narrowband, Best-M, M =1) |
| | 2. open loop (narrowband, Best-M, M > 1) |
| | 3. closed loop (narrowband, Best-M, M = 1) |
| | 4. closed loop (narrowband, Best-M, M > 1) |
| CINR type | 0: physical CINR, 1: effective CINR |
| codebook subset | 0: enable, 1: disable |
| PMI feedback mode | 0: standard mode, 1: differential mode |
| long-term period | period for transmitting long-term period feedback message |
| short-term period | period for transmitting short-term period feedback message |

Referring to Table 5, a feedback message to be transmitted by the MS may vary depending on the feedback mode. In this case, if the feedback message has a size of 4 to 6 bits, the feedback message is transmitted using a PFBCH. If the feedback message has a size of 7 to 24 bits, the feedback message is transmitted using an SFBCH.

Figure 11:
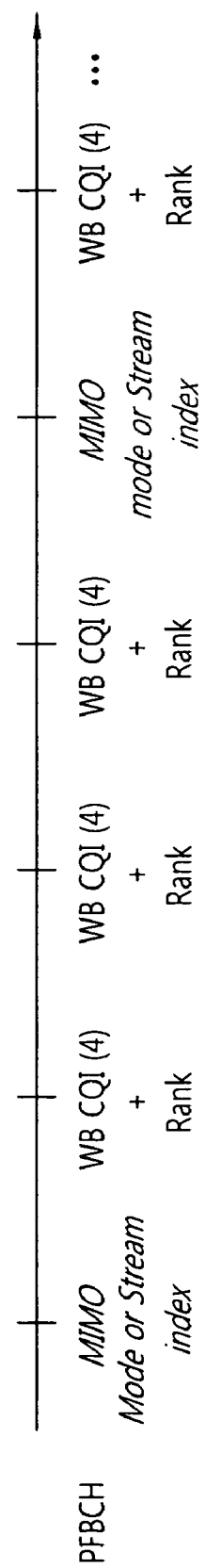
FIG. 11 shows an embodiment of a feedback message transmission method in a wideband feedback mode in which a precoding matrix index (PMI) is not included.
Figure 14:
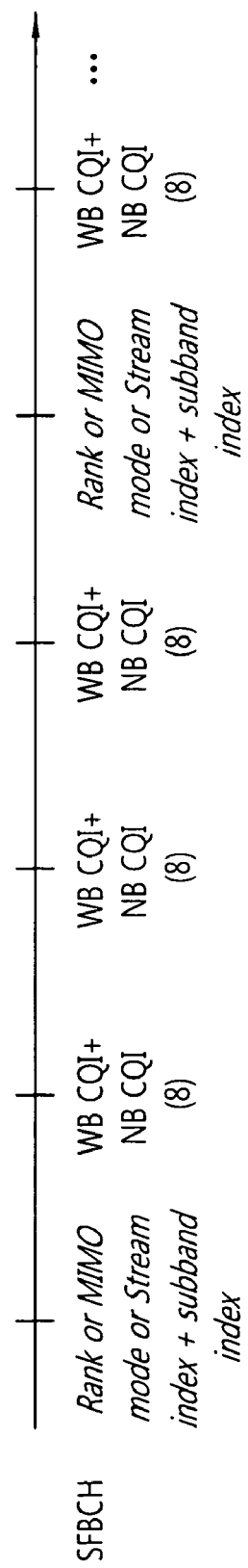
FIG. 14 shows an embodiment of a feedback message transmission method in a narrowband feedback (Best-M, M=1) mode in which a PMI is not included.
Figure 15:
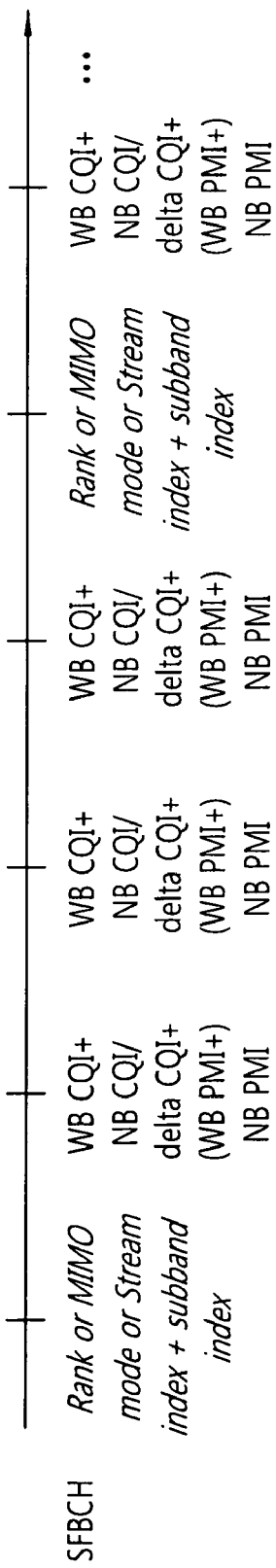
FIG. 15 shows an embodiment of a feedback message transmission method in a narrowband feedback (Best-M, M=1) mode in which a PMI is included.
Figure 17:
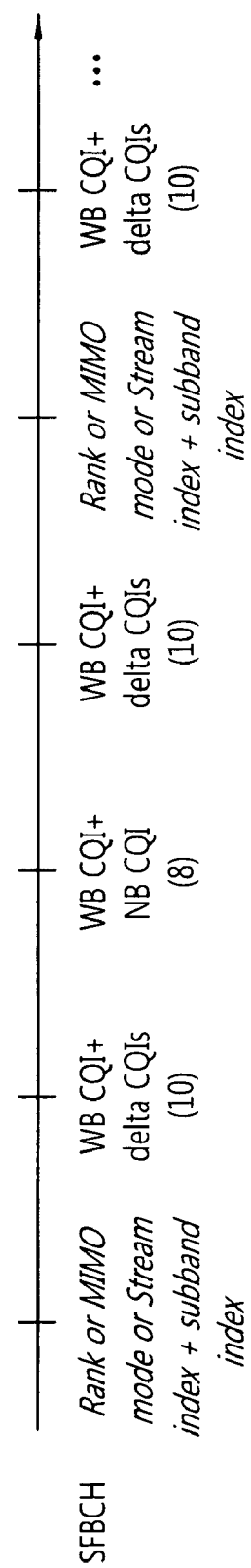
FIG. 17 shows an embodiment of a feedback message transmission method in a narrowband feedback (Best-M, M=3) mode in which a PMI is not included.
Figure 19:
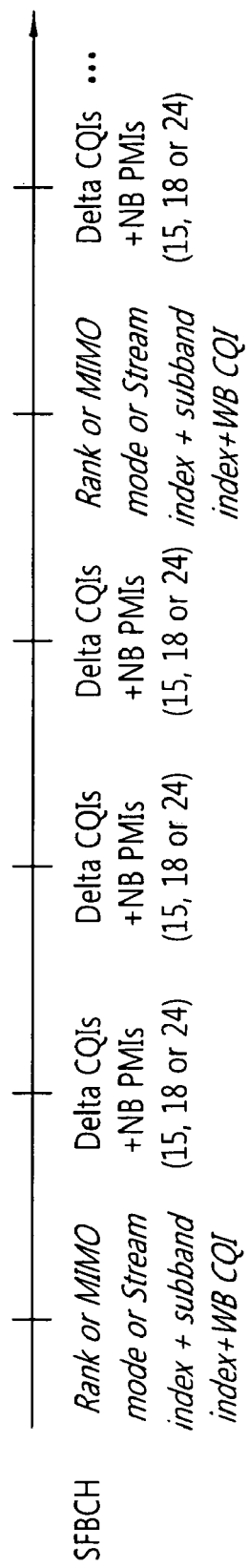
FIG. 19 shows an embodiment of a feedback message transmission method in a narrowband feedback (Best-M, M=3) mode in which a PMI is included.

An embodiment of a feedback message transmission method in the feedback mode 0 is shown in FIG. 11 to be described below, and an embodiment of a feedback message transmission method in the feedback mode 1 is shown in FIG. 14 to be described below. In addition, an embodiment of a feedback message transmission method in the feedback mode 2 is shown in FIG. 17 to be described below, an embodiment of a feedback message transmission method in the feedback mode 3 is shown in FIG. 15 to be described below, and an embodiment of a feedback message transmission method in the feedback mode 4 is shown in FIG. 19 to be described below.

FIG. 11 shows an embodiment of a feedback message transmission method in a wideband feedback mode in which a PMI is not included. Over a PFBCH, a short-term period feedback message including a 4-bit wideband CQI (or CINR) and a rank is transmitted in every frame, and prior to this transmission, a long-term period feedback message including a MIMO mode and/or a stream index is transmitted in every 4 frames.

Figure 12:
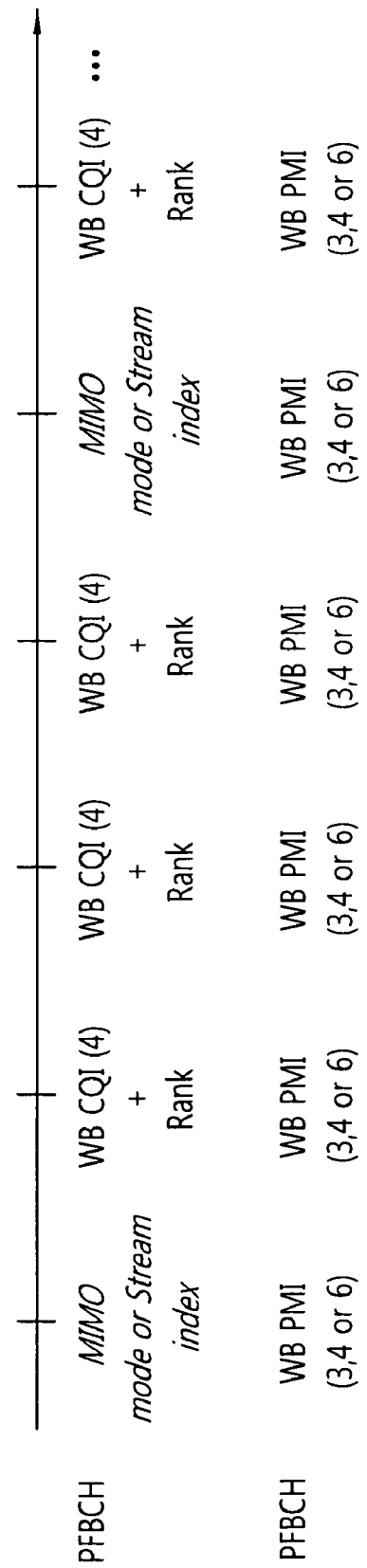
FIG. 12 shows an embodiment of a feedback message transmission method in a wideband feedback mode in which a PMI is included.

FIG. 12 shows an embodiment of a feedback message transmission method in a wideband feedback mode in which a PMI is included. Over a first PFBCH, a short-term period feedback message including a 4-bit wideband CQI and a rank is transmitted in every frame, and prior to this transmission, a long-term period feedback message including a MIMO mode and/or a stream index is transmitted in every 4 frames. Over a second PFBCH, a short-term period feedback message including a 3, 4, or 6 bit wideband PMI is transmitted in every frame.

Figure 13:
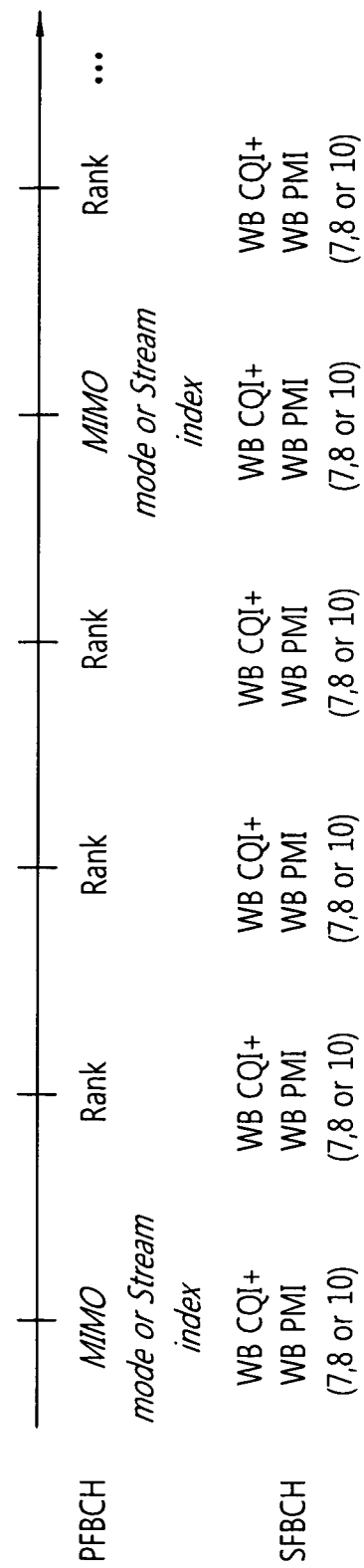
FIG. 13 shows another embodiment of a feedback message transmission method in a wideband feedback mode in which a PMI is included.

FIG. 13 shows another embodiment of a feedback message transmission method in a wideband feedback mode in which a PMI is included. Over a PFBCH, a short-term period feedback message including a rank is transmitted in every frame, and a long-term period feedback message including a MIMO mode and/or a stream index is transmitted in every 4 frames. Over an SFBCH, a short-term period feedback message including a 7, 8, or 10 bit wideband CQI and wideband PMI is transmitted in every frame.

FIG. 14 shows an embodiment of a feedback message transmission method in a narrowband feedback (Best-M, M=1) mode in which a PMI is not included. Over an SFBCH, a short-term period feedback message including an 8-bit wideband CQI and narrowband CQI is transmitted in every frame, and prior to this transmission, a long-term period feedback message including a rank, a MIMO mode and/or a stream index and a subband index is transmitted in every 4 frames.

FIG. 15 shows an embodiment of a feedback message transmission method in a narrowband feedback (Best-M, M=1) mode in which a PMI is included. Over an SFBCH, a short-term period feedback message including a wideband CQI, a narrowband CQI (or ΔCQI), and a narrowband PMI is transmitted in every frame, and prior to this transmission, a long-term period feedback message including a rank, a MIMO mode, and/or a stream index and a subband index is transmitted in every 4 frames.

FIG. 16 shows another embodiment of a feedback message transmission method in a narrowband feedback (Best-M, M=1) mode in which a PMI is included. Over a first PFBCH, a short-term period feedback message including a 4-bit wideband CQI and a rank is transmitted in every frame, and prior to this transmission, a long-term period feedback message including a MIMO mode and/or a stream index is transmitted in every 4 frames. Over a second PFBCH or an SFBCH, a short-term period feedback message including a narrowband PMI and a narrowband CQI (or ΔCQI) is transmitted in every frame, and prior to this transmission, a long-term period feedback message including a subband index is transmitted in every 4 frames.

FIG. 17 shows an embodiment of a feedback message transmission method in a narrowband feedback (Best-M, M=3) mode in which a PMI is not included. Over an SFBCH, a short-term period feedback message including a 10-bit wideband CQI and ΔCQI or an 8-bit wideband CQI and narrowband CQI is transmitted in every frame, and prior to this transmission, a long-term period feedback message including a rank, a MIMO mode and/or a stream index and a subband index is transmitted in every 4 frames.

FIG. 18 shows another embodiment of a feedback message transmission method in a narrowband feedback (Best-M, M=3) mode in which a PMI is not included. Over a PFBCH, a short-term period feedback message including a 4-bit wideband CQI and a rank is transmitted in every frame, and prior to this transmission, a long-term period feedback message including a MIMO mode and/or a stream index is transmitted in every 4 frames. Over an SFBCH, a short-term period feedback message including a narrowband CQI (or ΔCQI) is transmitted in every frame, and prior to this transmission, a long-term period feedback message including an 8 or 11-bit subband index is transmitted in every 4 frames.

FIG. 19 shows an embodiment of a feedback message transmission method in a narrowband feedback (Best-M, M=3) mode in which a PMI is included. Over an SFBCH, a short-term period feedback message including a 15, 18, or 24-bit ΔCQI and narrowband PMI is transmitted in every frame, and prior to this transmission, a long-term period feedback message including a rank and/or a MIMO mode and/or a stream index, a subband index, and a wideband CQI is transmitted in every 4 frames.

Figure 20:
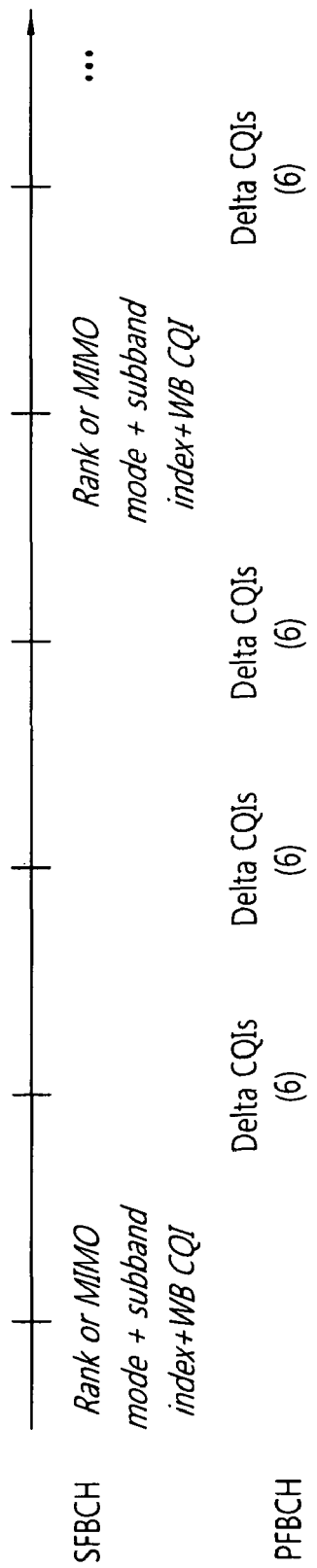
FIG. 20 shows another embodiment of a feedback message transmission method in a narrowband feedback (Best-M, M=3) mode in which a PMI is included.

FIG. 20 shows another embodiment of a feedback message transmission method in a narrowband feedback (Best-M, M=3) mode in which a PMI is included. Over an SFBCH, a long-term period feedback message including a rank and/or a MIMO mode, a subband index, and a wideband CQI is transmitted in every 4 frames. Over a PFBCH, a short-term period feedback message including a 6-bit ΔCQI is transmitted in every frame except for a frame in which a feedback message is transmitted.

FIG. 21 shows another embodiment of a feedback message transmission method in a narrowband feedback (Best-M, M=3) mode in which a PMI is included. Over a PFBCH, a short-term period feedback message including a 4-bit wideband CQI and a rank is transmitted in every frame, and prior to this transmission, a long-term period feedback message including a MIMO mode and/or a stream index is transmitted in every 4 frames. Over an SFBCH, a short-term period feedback message including a 15, 18, or 24 bit ΔCQI and narrowband PMI is transmitted in every frame, and prior to this transmission, a long-term period feedback message including a subband index and a wideband PMI is transmitted in every 4 frames.

In addition, feedback contents included in a feedback message may vary depending on a feedback format or a MIMO feedback mode included in feedback allocation information, and a channel for transmitting the feedback message may also vary. This is because the feedback message to be transmitted varies depending on a channel environment, and a type of a feedback channel through which a limited amount of information can be transmitted is determined according to the feedback message.

Table 6 shows an example of a MIMO feedback mode.

TABLE 6

| MIMO feedback mode | description | feedback contents |
|---|---|---|
| Mode 0 | OL SU MIMO SFBC/SM (diversity) | 1. rank<br>2. wideband CQI |
| Mode 1 | OL SU MIMO SM (diversity) | 1. rank<br>2. wideband CQI |
| Mode 2 | OL SU MIMO SM (localized) | 1. rank<br>2. narrowband CQI<br>3. subband index |
| Mode 3 | CL SU MIMO (localized) | 1. rank<br>2. narrowband CQI/PMI<br>3. subband index<br>4. wideband PMI |
| Mode 4 | CL SU MIMO (diversity) | 1. wideband CQI/PMI |
| Mode 5 | OL MU MIMO (localized) | 1. narrowband CQI<br>2. subband index<br>3. stream indicator |
| Mode 6 | CL MU MIMO (localized) | 1. narrowband CQI/PMI<br>2. subband index<br>3. wideband PMI |
| Mode 7 | CL MU MIMO (diversity) | 1. wideband CQI/PMI |

Referring to Table 6, among the MIMO feedback modes, wideband information can be transmitted in modes 0, 1, 4, and 7, and narrowband information can be transmitted in modes 2, 3, 5, and 6. Different feedback contents may be transmitted according to each of the determined MIMO feedback modes.

Figure 22:
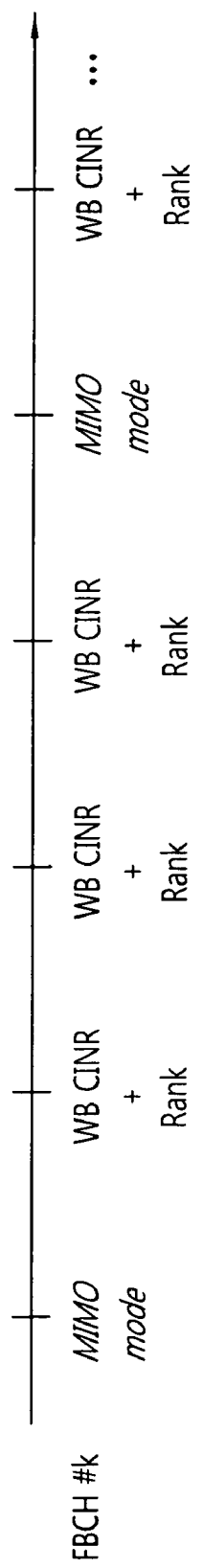
FIG. 22 shows an embodiment of a feedback message transmission method when open loop (OL)-single user (SU) (in distributed logical resource unit (LRU)) is determined as a multiple-input multiple-output (MIMO) feedback mode.

FIG. 22 shows an embodiment of a feedback message transmission method when OL-SU (in distributed LRU) is determined as a MIMO feedback mode. This may correspond to the mode 0 or 1 of Table 1 above. Over a $k^{th}$ FFBCH, a short-term period feedback message including a wideband CINR and a rank is transmitted in every frame, and prior to this transmission, a long-term period feedback message including a MIMO mode is transmitted in every 4 frames.

Figure 23:
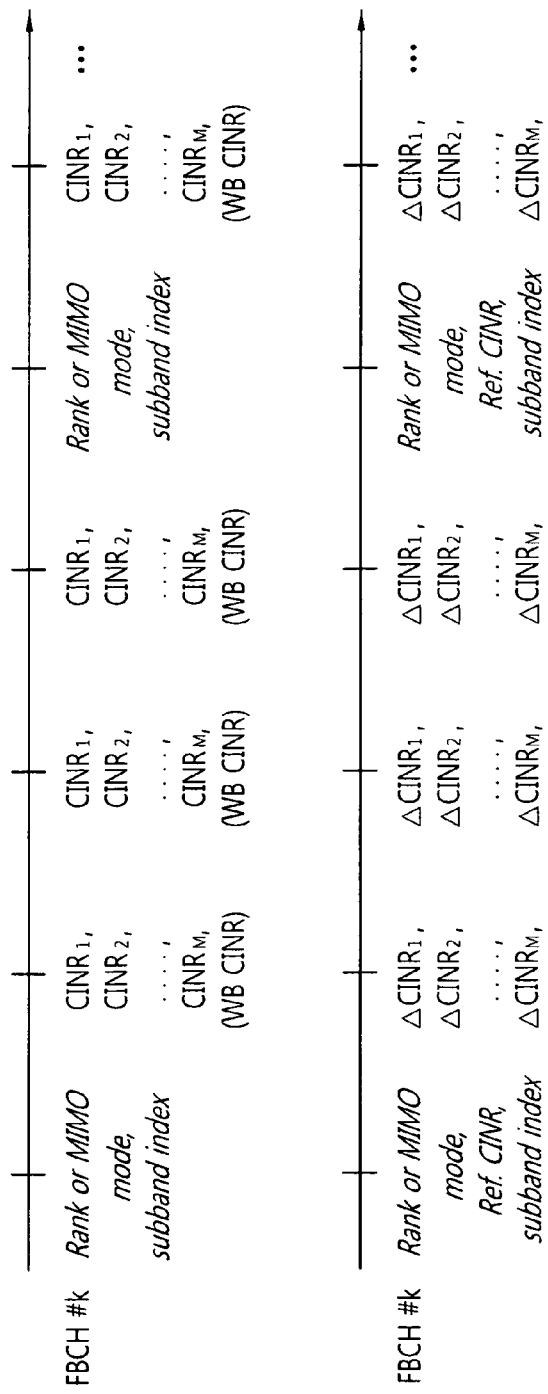
FIG. 23 shows an embodiment of a feedback message transmission method when OL-SU (in localized LRU, Best-M, M>1) is determined as a MIMO feedback mode.

FIG. 23 shows an embodiment of a feedback message transmission method when OL-SU (in localized LRU, Best-M, M>1) is determined as a MIMO feedback mode. This may correspond to the mode 2 of Table 6 above. Over a $k^{th}$ FFBCH, a short-term period feedback message including a CINR of Best-M is transmitted in every frame, and prior to this transmission, a long-term period feedback message including a rank and/or a MIMO mode and a subband index is transmitted in every 4 frames. Alternatively, ΔCINR may be transmitted instead of the Best-M CINR of the short-term period feedback message, and a reference CINR may be included in the long-term period feedback message.

Figure 24:
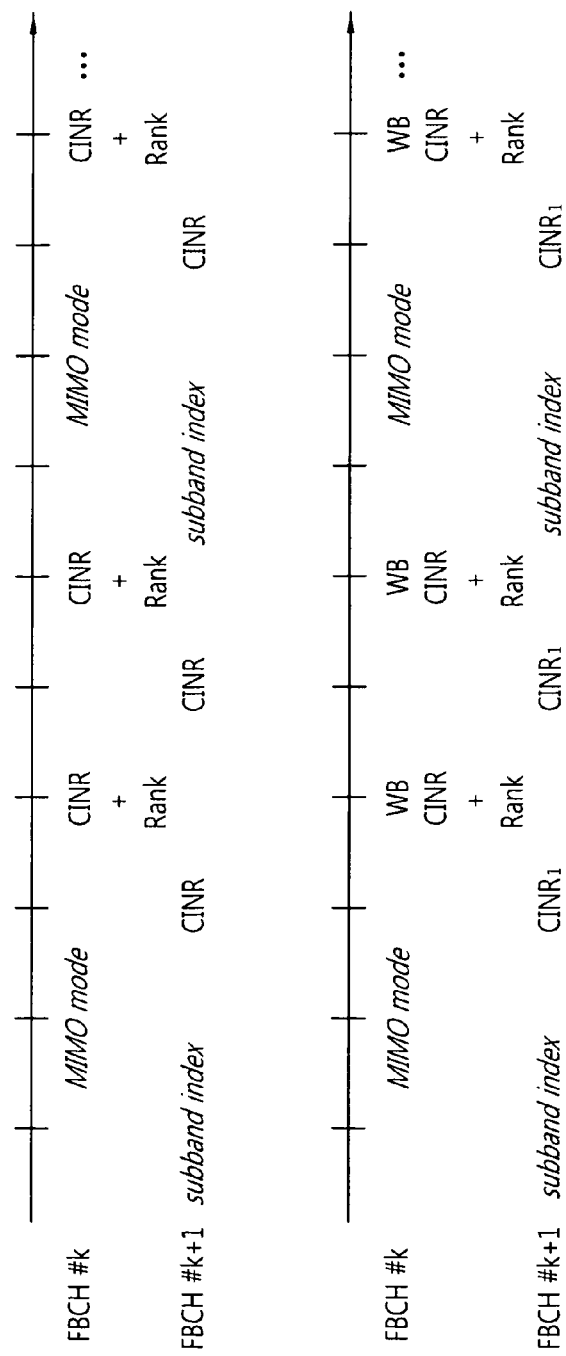
FIG. 24 shows an embodiment of a feedback message transmission method when OL-SU (in localized LRU, Best-M, M=1) is determined as a MIMO feedback mode.

FIG. 24 shows an embodiment of a feedback message transmission method when OL-SU (in localized LRU, Best-M, M=1) is determined as a MIMO feedback mode. This may correspond to the mode 2 of Table 6 above. Over a $k^{th}$ FFBCH, a short-term period feedback message including a CINR and a rank is transmitted in every 2 frames, and a long-term period feedback message including a MIMO mode is transmitted in every 4 frames. Over a $(k+1)^{th}$ FFBCH, a short-term period feedback message including a CINR is transmitted in every 2 frames while avoiding overlapping with the $k^{th}$ FFBCH, and a long-term period feedback message including a subband index is transmitted in every 4 frames. Alternatively, over the $k^{th}$ FFBCH, a whole band CINR may be transmitted instead by using the short-term period feedback message, and over the $(k+1)^{th}$ FFBCH, a Best-1 CINR (i.e., CINR1) may be transmitted instead.

Figure 25:
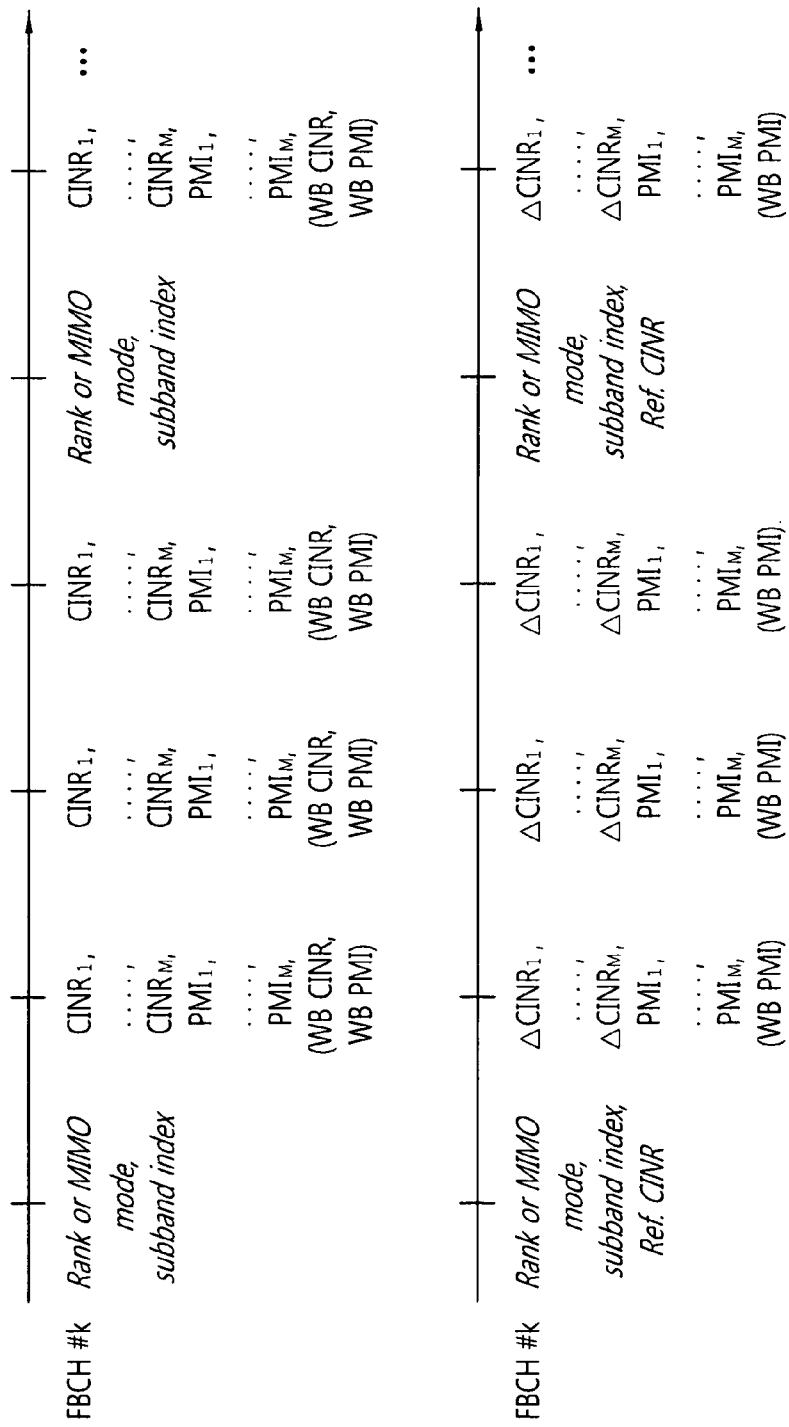
FIG. 25 shows an example of a feedback message transmission method when closed loop (CL)-SU (in localized LRU, Best-M, M>1) is determined as a MIMO feedback mode.

FIG. 25 shows an example of a feedback message transmission method when CL-SU (in localized LRU, Best-M, M>1) is determined as a MIMO feedback mode. This may correspond to the mode 3 of Table 6 above. Over a $k^{th}$ FFBCH, a short-term period feedback message including a Best-M CINR and PMI is transmitted in every frame, and prior to this transmission, a long-term period feedback message including a rank and/or a MIMO mode and a subband index is transmitted in every 4 frames. Alternatively, ΔCINR may be transmitted instead of the Best-M CINR of the short-term period feedback message, and a reference CINR may be included in the long-term period feedback message.

Figure 26:
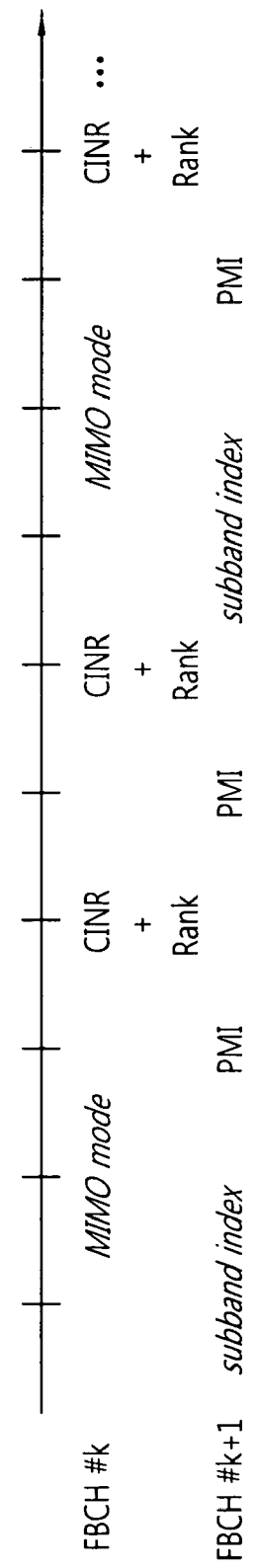
FIG. 26 shows an embodiment of a feedback message transmission method when CL-SU (in localized LRU, Best-M, M=1) is determined as a MIMO feedback mode.

FIG. 26 shows an embodiment of a feedback message transmission method when CL-SU (in localized LRU, Best-M, M=1) is determined as a MIMO feedback mode. This may correspond to the mode 3 of Table 6 above. Over a $k^{th}$ FFBCH, a short-term period feedback message including a CINR and a rank is transmitted in every 2 frames, and a long-term period feedback message including a MIMO mode is transmitted in every 4 frames. Over a $(k+1)^{th}$ FFBCH, a short-term period feedback message including a PMI is transmitted in every 2 frames while avoiding overlapping with the $k^{th}$ FFBCH, and a long-term period feedback message including a subband index is transmitted in every 4 frames.

Figure 27:
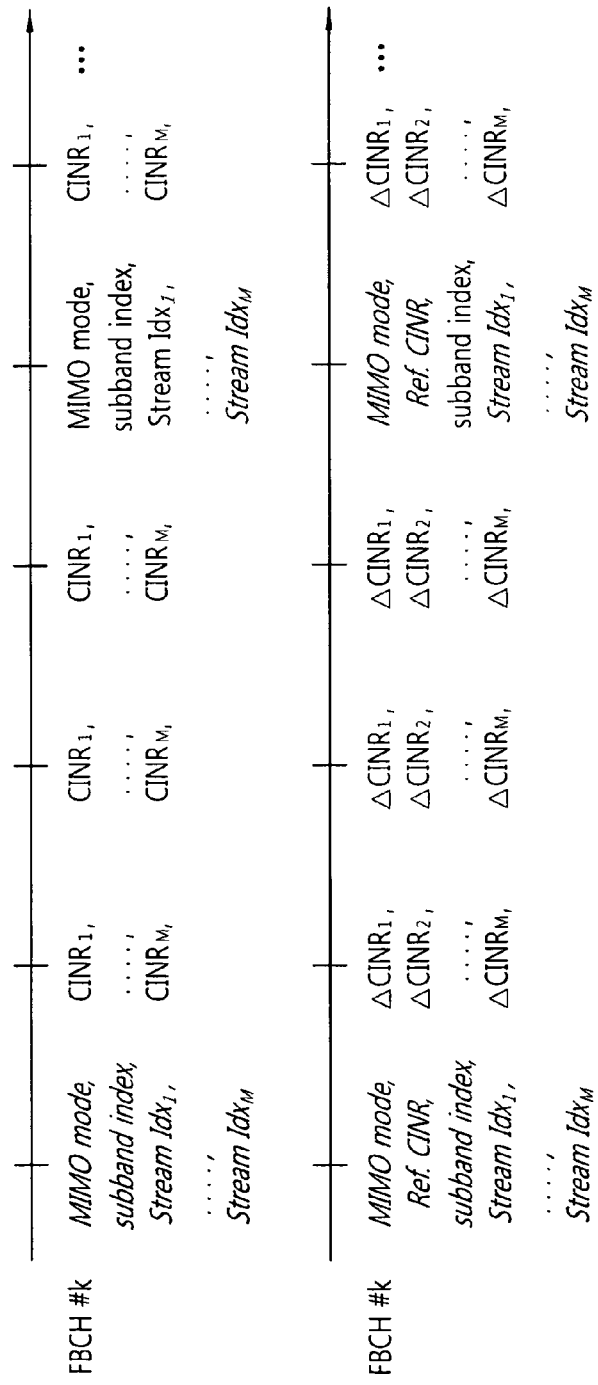
FIG. 27 shows an embodiment of a feedback message transmission method when OL-multi user (MU) (in localized LRU, Best-M, M>1) is determined as a MIMO feedback mode.

FIG. 27 shows an embodiment of a feedback message transmission method when OL-MU (in localized LRU, Best-M, M>1) is determined as a MIMO feedback mode. This may correspond to the mode 5 of Table 6 above. Over a $k^{th}$ FFBCH, a short-term period feedback message including a Best-M CINR is transmitted in every frame, and prior to this transmission, a long-term period feedback message including a MIMO mode, a subband index, and a Best-M stream index is transmitted in every 4 frames. Alternatively, ΔCINR may be transmitted instead of the Best-M CINR of the short-term period feedback message, and a reference CINR may be included in the long-term period feedback message.

Figure 28:
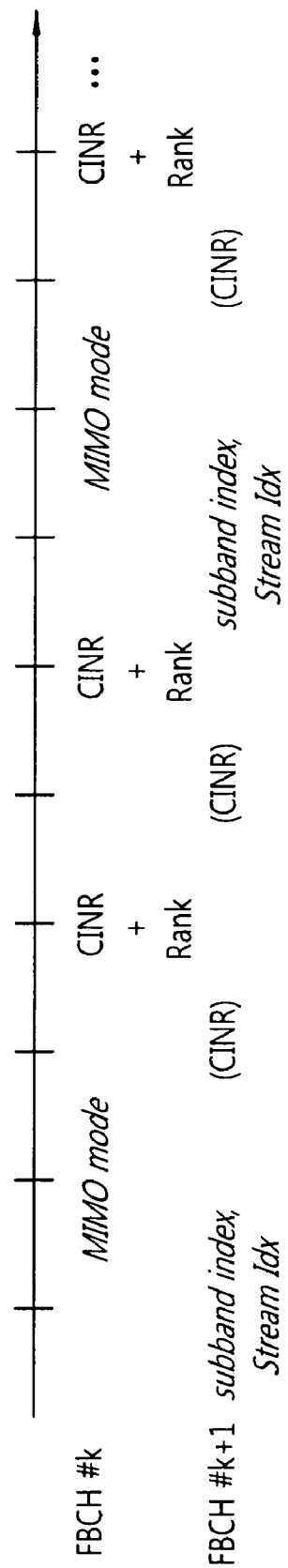
FIG. 28 shows an embodiment of a feedback message transmission method when OL-MU (in localized LRU, Best-M, M=1) is determined as a MIMO feedback mode.

FIG. 28 shows an embodiment of a feedback message transmission method when OL-MU (in localized LRU, Best-M, M=1) is determined as a MIMO feedback mode. This may correspond to the mode 5 of Table 6 above. Over a $k^{th}$ FFBCH, a short-term period feedback message including a CINR and a rank is transmitted in every 2 frames, and a long-term period feedback message including a MIMO mode is transmitted in every 4 frames. Over a $(k+1)^{th}$ FFBCH, a short-term period feedback message including a CINR is transmitted in every 2 frames while avoiding overlapping with the $k^{th}$ FFBCH, and a long-term period feedback message including a subband index and a stream index is transmitted in every 4 frames.

Figure 29:
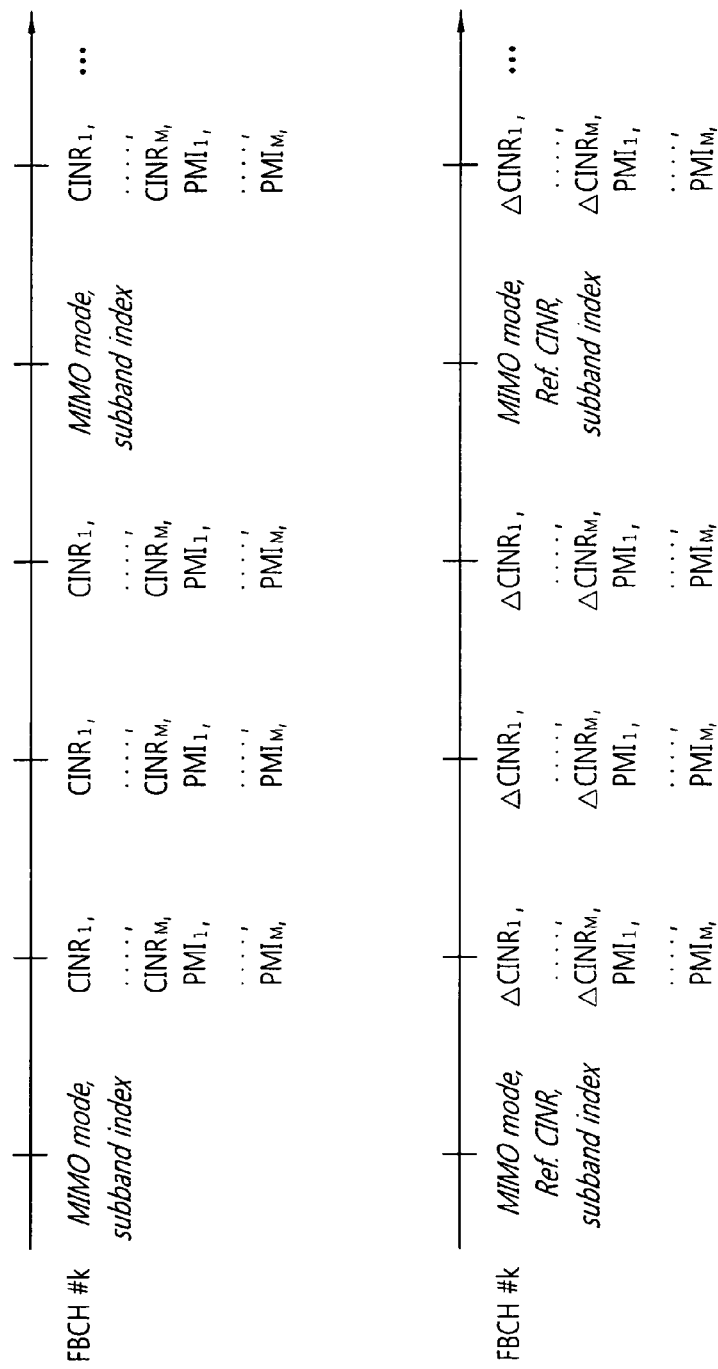
FIG. 29 shows an example of a feedback message transmission method when CL-MU (in localized LRU, Best-M, M>1) is determined as a MIMO feedback mode.

FIG. 29 shows an example of a feedback message transmission method when CL-MU (in localized LRU, Best-M, M>1) is determined as a MIMO feedback mode. This may correspond to the mode 6 of Table 6 above. Over a $k^{th}$ FFBCH, a short-term period feedback message including a Best-M CINR and PMI is transmitted in every frame, and prior to this transmission, a long-term period feedback message including a MIMO mode and a subband index is transmitted in every 4 frames. Alternatively, ΔCINR may be transmitted instead of the Best-M CINR of the short-term period feedback message, and a reference CINR may be included in the long-term period feedback message.

Figure 30:
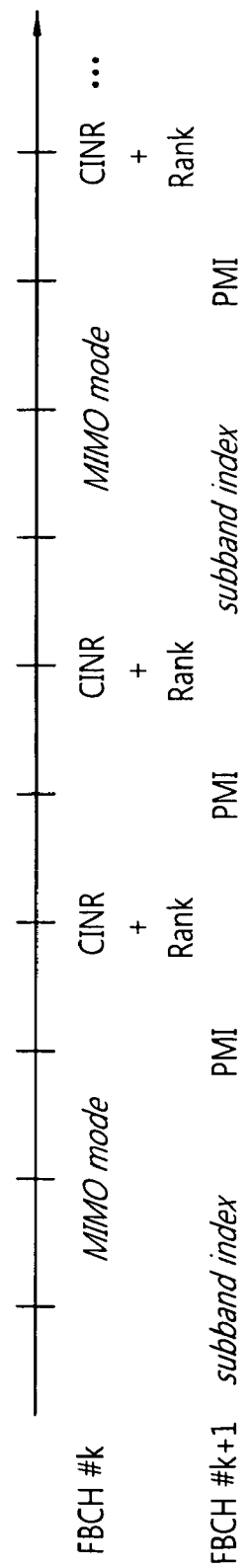
FIG. 30 shows an embodiment of a feedback message transmission method when CL-MU (in localized LRU, Best-M, M=1) is determined as a MIMO feedback mode.

FIG. 30 shows an embodiment of a feedback message transmission method when CL-MU (in localized LRU, Best-M, M=1) is determined as a MIMO feedback mode. This may correspond to the mode 6 of Table 6 above. Over a $k^{th}$ FFBCH, a short-term period feedback message including a CINR and a rank is transmitted in every 2 frames, and a long-term period feedback message including a MIMO mode is transmitted in every 4 frames. Over a $(k+1)^{th}$ FFBCH, a short-term period feedback message including a PMI is transmitted in every 2 frames while avoiding overlapping with the $k^{th}$ FFBCH, and a long-term period feedback message including a subband index is transmitted in every 4 frames.

Figure 31:
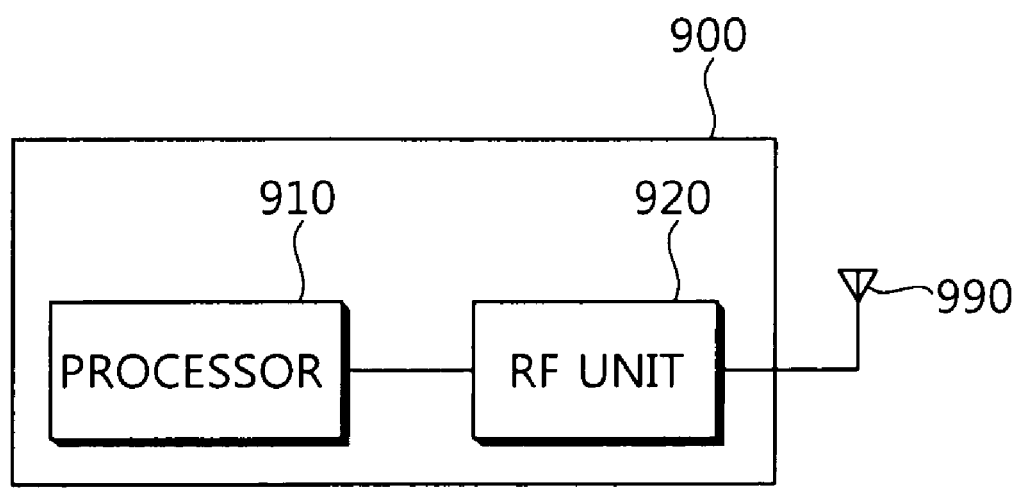
FIG. 31 is a block diagram showing a mobile station for implementing an embodiment of the present invention.

FIG. 31 is a block diagram showing an MS for implementing an embodiment of the present invention.

An MS 900 includes a processor 910 and a radio frequency (RF) unit 920. The processor 910 implements the proposed functions, processes, and/or methods.

The processor 910 receives information on a first period and a second period from a BS, and transmits a first feedback message in every first period or a second feedback message in every second period to the BS over a PFBCH. Herein, the first feedback message includes a CQI for a subband selected from a plurality of subbands, and the second feedback message includes a subband index of the selected subband. The RF unit 920 is coupled to the processor 910 and transmits and/or receives radio signals.

The processor 910 may include an application-specific integrated circuit (ASIC), a separate chipset, a logic circuit, and/or a data processing unit. The RF unit 920 may include a base-band circuit for processing a radio signal. When the embodiment of the present invention is implemented in software, the aforementioned methods can be implemented with a module (i.e., process, function, etc.) for performing the aforementioned functions. The module may be performed by the processor 910.

According to the present invention, narrowband information is transmitted through a primary fast feedback channel (PFBCH), and thus multiple users in a cell can be supported and a feedback message can be effectively transmitted.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method of transmitting a feedback message in a wireless communication system, the method comprising:
receiving information on a first period and a second period from a base station; and
transmitting a first feedback message in every first period or a second feedback message in every second period to the base station over a primary fast feedback channel (PFBCH),
wherein the first feedback message comprises a channel quality indicator (CQI) for a subband selected from a plurality of subbands, and the second feedback message comprises a subband index of the selected subband.

2. The method of claim 1, wherein the number of the selected subband is one.

3. The method of claim 1, wherein the CQI for the selected subband is computed by adding an average measure of a CQI over the plurality of subbands and a differential CQI of the selected subband.

4. The method of claim 3, wherein the first feedback message and the second feedback message is changed according to a value of Multiple-In Multiple-Out (MIMO) feedback mode.

5. The method of claim 1, wherein the transmitting of the first feedback message or the second feedback message comprises:
   selecting a sequence corresponding to the first feedback message or the second feedback message from a plurality of sequences; and
   transmitting the selected sequence by mapping the sequence to a symbol.

6. The method of claim 1, wherein the first feedback message further comprises a precoding matrix index (PMI) or a rank.

7. The method of claim 1, wherein the second period is a $2^n$ multiple of the first period (where n is a natural number).

8. The method of claim 1, wherein, if a period of the first feedback message overlaps with a period of the second feedback message, the second feedback message is transmitted.

9. The method of claim 1, further comprising receiving information on the selected subband from the base station.

10. A mobile station (MS) in a wireless communication system, the MS comprising:
    a radio frequency (RF) unit for transmitting or receiving a radio signal; and
    a processor coupled to the RF unit and configured to:
    receive information on a first period and a second period from a base station, and
    transmit a first feedback message in every first period or a second feedback message in every second period to the base station,
    wherein the first feedback message comprises a channel quality indicator (CQI) for a subband selected from a plurality of subbands, and the second feedback message comprises a subband index of the selected subband.

11. The MS of claim 10, wherein the number of the selected subband is one.

12. The MS of claim 10, wherein the first feedback message or the second feedback message is transmitted over a primary fast feedback channel (PFBCH).

13. The MS of claim 10, wherein, if a period of the first feedback message overlaps with a period of the second feedback message, the second feedback message is transmitted.

* * * * *